United States Patent
Toyoda

(10) Patent No.: US 9,293,753 B2
(45) Date of Patent: Mar. 22, 2016

(54) POROUS MEMBRANE FOR SECONDARY BATTERY, SLURRY FOR SECONDARY BATTERY POROUS MEMBRANE AND SECONDARY BATTERY

(75) Inventor: Yujiro Toyoda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 266 days.

(21) Appl. No.: 14/001,408

(22) PCT Filed: Feb. 24, 2012

(86) PCT No.: PCT/JP2012/054653
§ 371 (c)(1),
(2), (4) Date: Aug. 23, 2013

(87) PCT Pub. No.: WO2012/115252
PCT Pub. Date: Aug. 30, 2012

(65) Prior Publication Data
US 2013/0330590 A1    Dec. 12, 2013

(30) Foreign Application Priority Data

Feb. 25, 2011  (JP) ................................. 2011-040111

(51) Int. Cl.
*H01M 2/14*     (2006.01)
*H01M 2/16*     (2006.01)
*H01M 10/052*   (2010.01)

(52) U.S. Cl.
CPC ............ *H01M 2/1653* (2013.01); *H01M 2/166* (2013.01); *H01M 10/052* (2013.01); *H01M 2/1646* (2013.01)

(58) Field of Classification Search
CPC .......................... H01M 2/1666; H01M 2/1673
See application file for complete search history.

(56) References Cited

U.S. PATENT DOCUMENTS

| 2009/0111026 A1 | 4/2009 | Kim et al. |
| 2011/0159362 A1 | 6/2011 | Wakizaki et al. |
| 2011/0318630 A1* | 12/2011 | Wakizaka ........... H01M 2/1653 429/144 |
| 2011/0318631 A1 | 12/2011 | Nomura et al. |

FOREIGN PATENT DOCUMENTS

| EP | 2 372 811 A1 | 10/2011 |
| JP | 2005-327680 A | 11/2005 |
| JP | 2008-210791 A | 9/2008 |
| JP | 4569718 B2 | 10/2010 |
| JP | 2011-144245 A | 7/2011 |
| WO | WO 2010/074202 A1 | 7/2010 |
| WO | WO2010074202 * | 7/2010 |
| WO | WO 2012/029805 A1 | 3/2012 |

OTHER PUBLICATIONS

Extended European Search Report dated Jan. 26, 2015, issued in European Patent Application No. 12749695.8.
International Preliminary Report on Patentability dated Sep. 6, 2013 for PCT/JP2012/054653.
International Search Report, mailed Jun. 5, 2012, issued in PCT/JP2012/054653.

* cited by examiner

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

The porous membrane according to the present invention comprises non-conductive particles, a binder, and a water-soluble polymer, and is characterized in that: the three dimensions of the non-conductive particles, namely the length (L), thickness (t), and width (b), are such that the length (L) is 0.1 to 0 μm, the ratio (b/t) of the width (b) and the thickness (t) is 1.5 to 100; the binder is a copolymer containing (meth)acrylonitrile monomer units and (meth)acrylic acid ester monomer units; and the water-soluble polymer contains sulfonic acid groups, and has a weight average molecular weight of 1000 to 15000. The slurry for a porous membrane according to the present invention is characterized by being formed by dispersing the non-conductive particles, the binder, and the soluble polymer, in water. Thus, the present invention provides: a porous membrane that can be formed into a thin film, has an excellent sliding property, and generates few particles; and a slurry for porous membranes which is capable of producing porous membrane easily and quickly, and has excellent storage stability.

21 Claims, No Drawings

POROUS MEMBRANE FOR SECONDARY BATTERY, SLURRY FOR SECONDARY BATTERY POROUS MEMBRANE AND SECONDARY BATTERY

TECHNICAL FIELD

The present invention relates to a porous membrane, and further specifically, the present invention relates to the porous membrane formed on the surface of electrodes or separators of a secondary battery such as lithium ion secondary battery, and capable of being made thin; further also capable of contributing to improve the sliding property of the electrodes or the separates and to improve maintaining the safety of the battery. Also, the present invention relates to slurry for the porous membrane for forming said porous membrane. Also, the present invention relates to a secondary battery including electrodes or separators comprising said porous membrane.

BACKGROUND ART

Among the battery which is practically used, the lithium ion secondary battery exhibits the highest energy density, thus it is particularly used for the compact electronics. Also, in addition to the compact use, it is also expected to be used for the automobiles. Under such situation, it is in demand to make the lifetime of the lithium ion secondary battery longer and to have higher capacity, and to further improve the safety.

In the lithium ion secondary battery, generally in order to prevent the short circuit between the positive electrode and the negative electrode, polyolefin based organic separator such as polyethylene or polypropylene or so is used. The polyolefin based organic separator has a physical property which dissolves at 200° C. or less, thus in case the temperature of the inside of the battery becomes high due to the stimulus from the outside and/or the inside; shrinking or melting may occur, which causes to change the volume. As a result, the short circuit of the positive electrode and the negative electrode, and the explosion due to the release of the electrical energy or so may happen.

Hence, in order to solve such problems, conventionally it is proposed to form the porous membrane (hereinafter it may be referred as "porous membrane") which includes non-conductive particle such as inorganic particle on the electrodes or the separators.

For example, Patent document 1 discloses the porous membrane comprising plate shape particles as the insulating fine particles and the binder having the rupture elongation of 300% or more. According to Patent document 1, this porous membrane is arranged in a certain direction, thus it has better safety than using the spherical particles. Further, it is disclosed that it has excellent porous membrane elongation since the binder having the rupture elongation of 300% or more is used.

PRIOR ART DOCUMENT

Patent document 1: JP Patent Application Laid Open No. 2008-210791

SUMMARY OF THE INVENTION

Technical Problems to be Solved by the Invention

However, according to the keen examination by the present inventors, the porous membrane of Patent document 1 was unable to obtain the uniform membrane when it was made thin, had low sliding property, and had a problem of powder fall-off in which the non-conductive particle is released from the porous membrane during the electrode or the separator production step, particularly when winding the electrode or so.

Particularly, the plate shape particle causes the viscosity of the slurry for forming the porous membrane to increase and the porous membrane becomes difficult to make thin. Also, the planer shape particle has bad dispersibility. Therefore, it was difficult to obtain uniform porous membrane using the slurry including the plate shape particle.

Therefore, the present invention is achieved in view of such conventional arts, and the object of the present invention is to provide the porous membrane capable of making thin and has no powder fall-off, even when using the planer shape particle as the non-conductive particle. Also, the object of the present invention is to provide slurry having high storage stability for forming said porous membrane. Further, the object of the present invention is to provide the secondary battery comprising said porous membrane.

Modes for Carrying out the Invention

The slurry for the porous membrane described in Patent document 1 has high viscosity and has low storage stability. As a result of keen examination, the present inventors has found that when the planer shape particle is used as the non-conductive particle, it easily precipitates; hence when the porous membrane is produced using this slurry, the binder localized during the drying step; and as a result the powder fall-off from the obtained porous membrane occurred.

Thus, as a result of further keen examination, the present inventors have found that by forming the porous membrane using the slurry for the porous membrane including the non-conductive particle having a specific shape, the binder having specific monomer unit, aqueous polymer having sulfonic acid group and water; the orientation of the non-conductive particle in the porous membrane improves, further the sliding property improves, thus when the porous membrane is wound simultaneously with the electrodes and the separators or so, the powder fall-off is suppressed. Thereby, it was found that the cycle characteristic of the secondary battery including such porous membrane can be improved. Further, since the orientation of the non-conductive particle increases, it was found that the safety when it is made thin can be enhanced, thereby the present invention was attained.

The present invention which solves the above described objects includes the following as the gist.

(1) A porous membrane for a secondary battery including a non-conductive particle, a binder and an aqueous polymer; wherein when a three axial length of said non-conductive particle are a long diameter L, a thickness (t), and width (b), then the long diameter L is 0.1 to 20 μm, a ratio (b/t) between the width (b) and the thickness (t) is 1.5 to 100, said binder is a copolymer including (meth)acrylonitrile monomer unit and (meth)acrylate monomer unit; and said aqueous polymer includes sulfonic acid group and a weight average molecular weight is 1000 to 15000

(2) The porous membrane for the secondary battery as set forth in (1) wherein a ratio (=(meth)acrylonitrile monomer unit/(meth)acrylate monomer unit) between (meth)acrylonitrile monomer unit and (meth)acrylate monomer unit in said copolymer is 1/99 to 20/80 in terms of a weight ratio.

(3) The porous membrane for the secondary battery as set forth in (1) or (2) wherein said binder is crosslinkable by heat applying or an energy ray irradiation.

(4) The porous membrane for the secondary battery as set forth in any one of (1) to (3), wherein said copolymer includes a crosslinking group having heat crosslinking property, and said crosslinking group having heat crosslinking property is at least one selected from the group consisting of epoxy group, N-methylolamide group, and oxazolline group.

(5) The porous membrane for the secondary battery as set forth in any one of (1) to (4), wherein said copolymer includes a hydrophilic group selected from the group consisting of carboxyl acid group, hydroxyl group and sulfonic acid group.

(6) The porous membrane for the secondary battery as set forth in any one of (1) to (5), wherein an amount of a repeating unit comprising said sulfonic acid group in said aqueous polymer is 25 wt % or more and 90 wt % or less in terms of sulfonic acid group containing monomer amount.

(7) The porous membrane for the secondary battery as set forth in any one of (1) to (6), wherein said aqueous polymer includes a repeating unit comprising a carboxylic acid group.

(8) The porous membrane for the secondary battery as set forth in any one of (1) to (7), wherein a content of said binder is 0.1 to 20 parts by weight with respect to 100 parts by weight of the non-conductive particle, and the content of said aqueous polymer is 0.01 to 0.8 parts by weight with respect to 100 parts by weight of the non-conductive particle.

(9) The porous membrane for the secondary battery as set forth in any one of (1) to (8) including a nonionic surfactant having a cloud point of 30 to 90° C.

(10) A slurry for a secondary battery porous membrane including a non-conductive particle, a binder, an aqueous polymer and water; wherein when a three axial length of said non-conductive particle are a long diameter L, a thickness (t), and width (h), then the long diameter L is 0.1 to 20 μm, a ratio (b/t) between the width (b) and the thickness (t) is 1.5 to 100, said binder is a copolymer including (meth)acrylonitrile monomer unit and (meth)acrylate monomer unit; and said aqueous polymer includes sulfonic acid group and a weight average molecular weight is 1000 to 15000.

(11) The slurry for the secondary battery porous membrane as set forth in (10) wherein a TI value of said porous membrane slurry is 1.1 to 3.0.

(12) The slurry for the secondary battery porous membrane as set forth in (10) or (11) wherein a ratio (=(meth)acrylonitrile monomer unit/(meth)acrylate monomer unit) between (meth)acrylonitrile monomer unit and (meth)acrylate monomer unit in said copolymer is 1/99 to 20/80 in terms of a weight ratio.

(13) The slurry for the secondary battery porous membrane as set forth in any one of (10) to (13) wherein said binder is crosslinkable by heat applying or an energy ray irradiation.

(14) The slurry for the secondary battery porous membrane as set forth in any one of (10) to (13), wherein said copolymer includes a crosslinking group having heat crosslinking property, and said crosslinking group having heat crosslinking property is at least one selected from the group consisting of epoxy group, N-methylolamide group, and oxazolline group.

(15) An electrode for a secondary battery, wherein an electrode material mixture layer including a binder for the electrode material mixture layer and an electrode active material is adhered to a current collector, and said electrode comprises the porous membrane as set forth in any one of (1) to (9) on said electrode material mixture layer.

(16) A separator for a secondary battery comprising the porous membrane as set forth in any one of (1) to (9) on an organic separator.

(17) A secondary battery comprising a positive electrode, a negative electrode and an electrolytic solution, wherein at least one of said positive electrode and negative electrode is the electrode for the secondary battery as set forth in (15).

(18) A secondary battery comprising a positive electrode, a negative electrode, a separator and an electrolytic solution, wherein said separator is the separator for the secondary battery as set forth in (16).

Effect of the Present Invention

According to the present invention, the porous membrane capable of making the membrane thin, has high sliding property, few powder fall-off, and the non-conductive particle is uniformly dispersed can be provided. Further, according to the slurry for the porous membrane of the present invention, the above mentioned porous membrane having high dispersibility of the non-conductive particle, difficult to increase the viscosity and having excellent storage stability, capable of high speed coating, and with few powder fall-off can be formed easily.

MEANS FOR CARRYING OUT THE INVENTION

Hereinbelow, the porous membrane for the secondary battery, the slurry for the secondary battery porous membrane and the secondary battery of the present invention will be described in this order.

(The Porous Membrane for the Secondary Battery)

The porous membrane for the secondary battery of the present invention (hereinafter, it may be referred as "porous membrane") is a membrane having porosity placed between the positive electrode and the negative electrode of the secondary battery, and comprises the non-conductive particle, the binder and the aqueous polymer. Also, the porous membrane can be used by stacking on the separator or the electrode, or as the separator. Also, the slurry for the porous membrane comprises the non-conductive particle, the binder, and the aqueous polymer which are dispersed in the water.

(The Non-Conductive Particle)

As for the non-conductive particle, when the three axial lengths are long axis (L), the thickness (t) and the width (b); the plate shape particle having the long axis (L) of 0.1 to 20 μm, and the ratio (b/t) between the width (b) and the thickness (t) of 1.5 to 100 is used.

The three axial length of said non-conductive particle can be determined by the method described in below. By considering the non-conductive particle as a parallel piped shaped based on the below method, each size of said three axial lengths can be measured. That is, a box of a parallel piped shape having three axial lengths wherein one non-conductive particle can just fit is thought, and the longest length of the box is considered as the long axis (L), the thickness is considered t, and the width is considered b; thereby the size of this non-conductive particle is defined. Said size is given with a relation of (L)>(b)≥(t); and width (b) is the larger one of (b) or (t) unless these are the same. Specifically, using the electron microscope, the length of (L), (b), and (t) of the non-conductive particle is measured directly from the printed image by observing at magnification of 10000× to 20000×. 300 non-conductive particles selected arbitrarily are measured, and the three axial lengths of the non-conductive particle are defined by taking the average.

In the present invention, in any group of the 300 non-conductive particles arbitrarily selected, the average value of each of the measured (L), (b), and (t) only needs to satisfy the numerical range described in the following.

The ratio (b/t) between the width (b) and the thickness (t) of the non-conductive particle is 1.5 to 100, preferably 3 to 100, and more preferably 5 to 100. By having (b/t) of the non-conductive particle within said range, the non-conductive particle is uniformly orientated during the coating, thereby the stacking number of the non-conductive in the porous membrane can be made to an appropriate number, thus the safety of the secondary battery can be improved even when the porformingous membrane is made thin. On the other hand, when the non-conductive particle having (b/t) out of said range, the safety declines when the porous membrane is made thin.

The long axis (L) of the non-conductive particle is 0.1 µm to 20 µm, preferably 0.2 µm to 15 µm, and more preferably 0.5 to 10 µm. By having the long axis (L) of the non-conductive particle within said range, the permeability of the lithium ion can be maintained, and the decline of the output power of the lithium ion secondary battery can be suppressed, while the safety of the lithium ion secondary battery is prevented from declining. On the other hand, when the long axis (L) is out of said range, the permeability of the lithium ion in the porous membrane deteriorates and the output power declines.

The ratio (L/b) between the long axis (L) and the width (b) of the non-conductive particle is preferably 1 to 100, and more preferably 1 to 20, and particularly preferably 1 to 10. By setting the ratio (L/b) between the long axis (L) and the width (b) of said non-conductive particle within said range, the short circuit due to the lithium dendrite generated in the lithium ion battery can be effectively prevented, and the safety can be enhanced.

As for the material constituting the non-conductive particle, it is desired to be stable under the used condition of the lithium ion secondary battery and also electrochemically stable as well. For example, various inorganic particles and organic particles of non-conductive type can be used.

As for the inorganic particles, oxide particles such as iron oxide, silicon oxide, aluminum oxide, magnesium oxide, titanium oxide or so; nitride particles such as aluminum nitride, boron nitride or so; covalent bond crystal particle such as silicon, diamond or so; poorly soluble ionic crystal particles such as barium sulfate, calcium fluoride, barium fluoride or so can be used. These particles may be carried out with element substitution, surface treatment and solidification if needed, and also it may be used alone or by combing two or more thereof. Among these, oxide particles are preferable form the point of stability in the electrolytic solution and the electrical potential stability.

As for the organic particles, particles comprising various polymer such as polystyrene, polyethylene, polyimide, melamine resin, phenol resin or so can be used. The resin forming the particle may be a mixture, a reformed body, derivative, random copolymer, an alternating copolymer, a graft copolymer, a block copolymer, a crosslinked body or so of the above mentioned polymer. The particles may be made polymer of two or more types. Also, it is possible to use by providing the electrical insulation by carrying out the surface treatment with the non-conductive substance to the surface of the fine powder of the oxides or compound having the conductivity and the conductive metal such as carbon black, graphite, $SnO_2$, ITO and metal powder or so. These non-conductive particles may be used by combining two or more thereof.

The average particle diameter (D50 average particle diameter of the volume average) of the non-conductive particle is preferably 5 nm to 10 µm, and more preferably 10 nm to 5 µm. By having the average particle diameter of the non-conductive particle within said range, it is easy to regulate the condition of the dispersibility and also it is easy to obtain the membrane with predetermined thickness having uniform quality. When the average particle diameter of the non-conductive particle is within the range of 50 nm to 2 µm, it is particularly preferable since the dispesibility, the easiness of the coating and the control of the air space are excellent.

Also, as the BET specific surface area of these particles, it is preferably 0.9 to 200 $m^2$/g, and more preferably 1.5 to 150 $m^2$/g, from the point suppressing the aggregation of the particles and to optimize the fluidity of the slurry.

(The Binder)

In the present invention, the copolymer including (meth) acrylonitrile monomer unit and (meth)acrylate monomer unit is used as the binder. As the binder being said copolymer, the elution to the electrolytic solution is not exhibited; thus the deformation of the porous membrane can be made less likely to happen. Further, the swelling property of the electrolytic solution at high temperature can be maintained while the elution is less likely to happen, thereby exhibit a high temperature characteristic. By combining this and said non-conductive particle diameter, the safety of the porous membrane can be further improved. This copolymer can be obtained by copolymerizing at least the monomer forming (meth)acrylonitrile monomer unit and the monomer forming (meth) acrylate monomer unit.

As the monomer forming (meth)acrylonitrile monomer unit, alkyl (meth)acrylate and (meth)acrylate having a functional group on the side chain may be mentioned. Among these, alkyl (meth)acrylate is preferable. The carbon atoms of the alkyl group binding with the non-carbonyl oxygen atom of alkyl (meth)acrylate is preferably 1 to 14 and more preferably 1 to 5; since it exhibits the conductivity of lithium ion due to the swelling to the electrolytic solution, and it is unlikely to cause the crosslinkage aggregation by the polymer during the dispersion of the small diameter particle. Also, in (meth)acrylate monomer, all of or a part of hydrogen of the alkyl group may be haloalkyl group substituted by halogen such as fluorine or so.

By having the carbon atoms of said alkyl group within said range, the affinity is enhanced between the surface functional group of the non-conductive particle and the copolymer including (meth)acrylonitrile monomer unit and (meth)acrylate monomer unit, thereby the porous membrane with further less powder fall-off can be obtained.

As alkyl (meth)acrylate having 1 to 5 of the carbon atoms of the alkyl group binding with the non-carbonyl oxygen atom; alkyl acrylate such as methyl acrylate, ethyl acrylate, n-propyl acrylate, isopropyl acrylate, n-butyl acrylate, and t-butyl acrylate or so; ethyl 2-(perfluoroalkyl)acrylate such as ethyl 2-(perfluorobutyl)acrylate, ethyl 2-(perfluoropentyl) acrylate or so; alkyl methacrylate such as methyl methacrylate, ethyl metacrylate, n-propyl methacrylate, isopropyl methacrylate, n-butyl methacrylate, and t-butyl methacrylate or so; ethyl 2-(perfluoroalkyl)methacrylate such as ethyl 2-(perfluorobutyl)methacrylate, ethyl 2-(perfluoropenty) methacrylate or so may be mentioned.

As other alkyl (meth)acrylate; alkyl acrylate having 6 to 18 carbon atoms of the alkyl group binding with the non-carbonyl oxygen atom such as n-hexyl acrylate, 2-ethylhexyl acrylate, nonyl acrylate, lauryl acrylate, stearyl acrylate, cyclohexyl acrylate, and isobonyl acrylate or so; alkyl methacrylate having 6 to 18 carbon atoms of the alkyl group binding with the non-carbonyl oxygen atom such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate or so; ethyl 2-(perfluoroalkyl)acrylate having 6 to 18 carbon atoms of the alkyl group binding with the non-carbonyl oxygen atom such as ethyl 2-(perfluorohexyl)acrylate, ethyl 2-(perfluorooctyl)acrylate, ethyl 2-(perfluorononyl)acrylate, ethyl 2-(perfluorodecyl)acrylate, ethyl 2-(perfluorododecyl)acrylate, ethyl 2-(perfluorotetradecyl)acrylate, ethyl 2-(perfluorohexadecyl)acrylate or so; ethyl 2-(perfluoroalkyl)methacrylate having 6 to 18 carbon atoms of the alkyl group binding with the non-carbonyl oxygen atom such as ethyl 2-(perfluorohexyl)methacrylate, ethyl 2-(perfluorooctyl)methacrylate, ethyl 2-(perfluorononyl)methacrylate, ethyl 2-(perfluorodecyl)methacrylate, ethyl 2-(perfluorododecyl)methacrylate, ethyl 2-(perfluorotetradecyl)methacrylate, ethyl 2-(perfluorohexadecyl)methacrylate or so may be mentioned.

As the monomer forming (meth)acrylonitrile monomer unit suitably used in the present invention, acrylonitrile and methacrylonitile or so may be mentioned.

In the present invention, the ratio between (meth)acrylonitrile monomer unit and (meth)acrylate derived monomer unit in the copolymer (=(meth)acrylonitrile monomer unit/(meth)acrylate monomer unit) is preferably 1/99 to 20/80, more preferably 1/99 to 15/85, and more preferably 1/99 to 10/90 in a weight ratio. By having the ratio between (meth)acrylonitrile monomer unit and (meth)acrylate monomer unit within said range, the deformation of the porous membrane occurs less without exhibiting the elution to the electrolytic solution. Further, the swelling property of the electrolytic solution can be maintained while suppressing the elution even at high temperature, thereby exhibit an excellent high temperature characteristic. Also, the affinity with the surface functional group of the non-conductive particle is enhanced, thereby the porous membrane having further less powder fall-off can be obtained.

In the present invention, the total content ratio of (meth)acrylonitrile monomer unit and (meth)acrylate monomer unit is preferably 50 wt % to 99.9 wt %, more preferably 60 wt % to 99.5%, and particularly preferably 75 wt % to 99.0 wt %. Also, by having the total content ratio of (meth)acrylonitrile monomer unit and (meth)acrylate monomer unit within said range, the dispersibility of the non-conductive particle and the flexibility of the porous membrane can be both enhanced.

The binder used in the present invention is preferably crosslinkable by heat applying or energy ray irradiation. By using the crosslinkable binder by heat applying or energy ray irradiation, the crosslinking density can be regulated by the strength of the heat applying or the energy ray irradiation. Also, the higher the crosslinking density is, the smaller the swelling degree becomes, and hence by changing the crosslinking density, the swelling degree can be regulated.

The crosslinkable binder by heat applying or the energy ray irradiation can be obtained by introducing the crosslinker in the binder, and/or by introducing the crosslinking group in the copolymer constituting the binder.

Among these, by introducing the crosslinker comprising the crosslinking group having the thermal crosslinking property in to the binder in addition to said copolymer, and/or by introducing the crosslinking group having the heat crosslinking property in the copolymer constituting the binder, the porous membrane can be crosslinked by carrying out the heat treatment after the porous membrane is formed, further the dissolution to the electrolytic solution can be suppressed; hence it is preferable since strong and flexible porous membrane can be obtained.

In case of comprising the crosslinker having the crosslinking group in addition to said copolymer in the binder, as for the crosslinker, it is not particularly limited, however organic peroxides or the crosslinker which exhibit the effect by heat or light can be used. Among these, from the point of comprising the crosslinking group having a heat crosslinking property, organic peroxides or the crosslinker exhibiting the effect by heat is preferable.

As for the peroxides, for example, ketone peroxides such as methylethyl ketone peroxide, cyclohexanon peroxide or so; peroxy ketals such as 1,1-bis(t-butylperoxy)3,3,5-trimethylcyclohexane, 2,2-bis(t-butylperoxy)butane or so; hydro peroxides such as t-butylhydroperoxide, 2,5-dimethylhexane-2,5-dihydroperoxide or so; dialkyl peroxide such as dicumyl peroxide, 2,5-dimethyl-2,5-di(t-butylperooxy)hexyne-3,α,α' bis(t-butylperoxy-m-isopropyl)benzene or so; diacyl peroxides such as octanoyl peroxide, isobutyl peroxide or so; peroxy esters such as peroxydicarbonate or so may be mentioned. Among these, dialkylperoxide is preferable from the point of the performance of the resin after crosslinked, and the type of the alkyl group is preferably changed depending on the molding temperature.

The crosslinker (curing agent) exhibiting the effect by the heat is not particularly limited as long as it carries out the crosslinking reaction by heat applying; however aliphatic polyamine such as diamine, triamine or larger than these or so; alicyclic polyamine, aromatic polyaminebisazide, acid anhydride, diol, polyvalent phenol, polyamide, diisocyanate, polyisocyanate or so may be mentioned. As specific example, for example, aliphatic polyamines such as hexamethylene diamine, triethylene tetramine, diethylene triamine, tetraethylenepentamine or so; alicyclic polyamine such as diaminocyclohexane, 3(4),8(9)-bis(aminomethyl)tricycle [5.2.1.0$^{2,6}$]decane, 1,3-(diaminomethyl)cyclohexane, mencene diamine, isophoronediamineN-aminoethylpiperazine, bis(4-amino-3-methylcyclohexyl)methane, bis(4-aminocyclohexyl)methane or so; aromatic polyamines such as 4,4'-diaminodiphenylether, 4,4'-diaminodiphenylmethane, α,α'-bis(4-aminophenyl)-1,3-diisopropyl benzene, α,α'-bis(4-aminophenyl)-1,4-diisopropyl benzene, 4,4'-diaminodiphenylsulfone, metaphenyldiamine or so; bis azides such as 4,4-bisazidebenzal(4-methyl)cyclohexanone, 4,4'-diazidechalcone, 2,6-bis(4'-azidebenzal)cyclohexanone, 2,6-bis(4'-azidebenzal)-4-methyl-cyclohexanone, 4,4'-diazidediphenylsulfone, 4,4'-diazidediphenylmethane, 2,2'-diazidestillbene or so; acid anhydrides such as phthalic anhydride, pyromellitic anhydride, benzophenonetetra carboxylic anhydride, nadic acid anhydride, 1,2-cyclohexanecarboxylic acid, modified polypropylene maleic anhydride, modified norbornene resin maleic anhydride or so; diols such as 1,3' butane diol, 1,4'-butandiol, hydroquinonedihydroxydiethylether, tricyclodecanedimethanol or so; triols such as 1,1,1-trimethylolpropane or so; polyvalent phenol such as phenol novolac resin, cresol novolac resin or so; polyvalent alcohols such as tricyclodecanediol, diphenylsilane diol, ethylene glycol and the derivative thereof, diethyleneglycol and the derivative thereof, triethyleneglycol and the derivative thereof or so; polyamides such as nylon-6, nylon-66, nylon-610, nylon-11, nylon-612, nylon-12, nylon-46, methoxymethylated polyamide, polyhexamethylenediaminetelephthalamide, polyhexamethyleneisophthalamide or so; diisocyanates such as hexamethylenediisocyanate, toluoylenediisocyanate or so; polyisocyanates such as dimers or trimmers of diisocyanates, adduct products of diols or triols to diisocyanates or so; blocked isocyanates of which isocyanate part is protected by blocking agent or so may be mentioned.

These may be used alone or as a mixture of two or more thereof. Among these, from the point of having excellent porous membrane strength or adhesiveness or so, aromatic polyamines, acid anhydrides, polyvalent phenols, polyvalent alcohols are preferable; and among these, 4,4-diaminodiphenylmethane (aromatic polyamines), modified norbornene resin maleic anhydride (acid anhydride), polyvalent phenols are particularly preferable.

The crosslinker exhibiting the effect by the light is not particularly limited as long as it is a photoreactive substance which generates the crosslinked compound by reacting with the copolymer due to the irradiation of the activation light such as ultraviolet ray of g ray, h ray, and I ray or so, far ultraviolet ray, X ray, electron beam or so. However, for example, aromatic bisazide compound, light amine generating agent, light acid generating agent or so may be mentioned.

As the specific example of aromatic bisazide compound, 4,4'-diazidechalcone, 2,6-bis(4'-azidebenzal)cyclohexanone, 2,6-bis(4'-azidebenzal)4-methylcyclohexanone, 4,4'-diazidediphenylsulfone, 4,4'-diazidebenzophenone, 4,4'-diazidediphenyl, 2,7-diazidefluorene, 4,4'-diazidephenylmethane or so may be mentioned as representative examples. These may be used alone, or by combining two or more thereof.

As the specific example of light amine generating agent, o-nitrobenziloxycarbonylcarbamate, 2,6-dinitrobenzyloxycarbonylcarbamate or α,α-dimethyl-3,5-dimethoxybenzyloxycarbonylcarbamate or so of aromatic amine or aliphatic amine may be mentioned. More specifically, o-nitrobenziloxycarbonylcarbamate such as aniline, cyclohexylamine, pyperidine, hexamethylenediamine, triethylenetetramine, 1,3-(diaminomethyl)cyclohexane, 4,4'-diaminophenylether, 4,4'-diaminodiphenylmethane, phenylenediamine or so may be mentioned. These may be used alone, or by combining two or more thereof.

The light acid generating agent is a substance which generates Broenstead acid or Lewis acid by the irradiation of the activation light; and for example onium salt, halogenated organic compound, quinoneazide compound, α,α-bis(sulphonyl)diazomethane compound, α-carbonyl-α-sulfonyldiazomethane compound, sulfonated compound, organic acid ester compound, organic acid amide compound, organic acid imide compound or so may be mentioned. The compound which can generate acid by cleaving due to the irradiation of these activation light may be used alone or by combining two or more thereof.

These crosslinkers can be used alone or by combining two or more thereof. The blending amount of the crosslinker is usually 0.001 to 30 parts by weight, preferably 0.01 to 25 parts by weight, and more preferably 1 to 20 parts by weight with respect to 100 parts by weight of the copolymer used as the binder in the present invention. When the blending amount of these crosslinkers is within said range, the balance between the lithium conductivity of the crosslinking product and the crosslinked property in the electrolytic solution, the electrolytic solution solubility and the porous membrane strength or so are excellent hence it is preferable.

When using the crosslinker in the present invention, by further using the crosslinking assistant agent (the curing assistant agent), the crosslinking property and the dispersibility of the blending agent can be further enhanced thus it is preferable. The crosslinking assistant agent used in the present invention is not particularly limited, and it may be those disclosed in JP Patent Application Laid Open No. S62-34924. For example, oxime nitroso crosslinking assistant agent such as quinonedioxime, benzoquinone dioxime, p-nitrosophenol or so; maleimide crosslinking assistant agent such as N,N-m-phenylenebismaleimide or so; allyl crosslinking assistant agent such as diallyl phthalate, triallyl cyanurate, triallylisocyanurate or so; methacrylate crosslinking assistant agent such as ethyleneglycoldimethacrylate, trimethylolpropane trimethacrylate or so; vinyl crosslinking assistant agent such as vinyl toluene, ethylvinylbenzene, divinylbenzene or so may be mentioned. Among these, allyl crosslinking assistant agent and methacrylate crosslinking agent are preferable since it can be dispersed uniformly.

The added amount of the crosslinking assistant agent is selected accordingly depending on the type of the crosslinker, however usually it is 0.1 to 10 parts by weight, and preferably 0.2 to 5 parts by weight with respect to 1 part by weight of the crosslinker. If the added amount of the crosslinking assistant agent is too little, it may be difficult to crosslink; and on the other hand, if the added amount is too much, the water resistance and the lithium conductivity of the binder being crosslinked may decline.

As the method for introducing the crosslinking group having the heat crosslinking property in the copolymer constituting the binder, the method of using mono functional monomer with one olefin double bond comprising the crosslinking group having the heat crosslinking property, or the method using the poly functional monomer with at least two olefin double bonds may be mentioned. As the crosslinking group having the heat crosslinking property included in the mono functional monomer with one olefin double bond, it is preferably at least one selected from the group consisting of epoxy group, N-methylolamide group, and oxazolline group; and from the point of easy regulation of the crosslinking and the crosslinking density, epoxy group is more preferable.

The crosslinking group having the heat crosslinking property can be introduced into the copolymer by compolymerizing, the monomer forming (meth)acrylonitrile monomer unit and the monomer forming (meth)acrylate monomer, the monomer comprising the crosslinking group having heat crosslinking property, and/or other monomer copolymerizable therewith, when producing said copolymer.

As for the monomer comprising epoxy group (including glycidyl group), the monomer comprising carbon-carbon double bond and epoxy group, and the monomer comprising halogen atom and epoxy group may be mentioned.

As for the monomer comprising carbon-carbon double bond and epoxy group, for example unsaturated glycidyl ether such as vinyiglycidyl ether, allyl glycidyl ether, butenyl glycidyl ether, o-allylphenylglycidylether or so; monoepoxide of diene or polyene such as butadiene monoepoxide, chloroprene monoepoxide, 4,5-epoxy-2-pentene, 3,4-epoxy-1-vinylcyclohexene, 1,2-epoxy-5,9-cyclododecadiene or so; alkenyl epoxide such as 3,4-epoxy-1-butene, 1,2-epoxy-5-hexene, 1,2-epoxy-9-decene or so; unsaturated glycidyl esters such as glycidyl acrylate, glycidyl methacrylate, glycidyl crotonate, glycidyl-4-heptenoate, glycidyl solbate, glycidyl linoleate, glycidyl-4-methyl-3-pentenoate, glycidyl ester of 3-cyclohexene, glycidyl ester of 4-methyl-3-cyclohexenecarboxylic acid or so may be mentioned.

As for the monomer comprising halogen atoms and the epoxy groups, for example, epihalohydrin such as epichlorohydrin, epiboromohydrin, epiiodohydrin, epifluorohydrin, β-methylepichlorohydrin or so; p-chlorostyreneoxide, dibromophenylglycidylether may be mentioned.

As for the monomer comprising N-methylolamide group, (meth)acrylamides such as N-methylol(meth)acrylamide may be mentioned.

As for the monomer, 2-vinyl-2-oxazolline, 2-vinyl-4-methyl-2-oxazolline, 2-vinyl-5-methyl-2-oxazolline, 2-isopropenyl-2-oxazolline, 2-isopropenyl-4-methyl-2-oxazolline, 2-isopropenyl-5-methyl-2-oxazolline, 2-isopropenyl-5-ethyl-2-oxazolline or so may be mentioned.

As for the polyfunctional monomer having at least two olefin double bonds, allylacrylate or allylmethacrylate, trimethylolpropane-triacrylate, trimethylolpropane-methacrylate, dipropyleneglycoldiallylether, polyglycoldiallylether, triethyleneglycoldivinylether, hydroquinonediallylether, tetraallyloxyethane, or other allyl of polyfunctional alcohol or, vinylether, tetraethyleneglycoldiacrylate, triallylamine, trimethylolpropane-diallylether, methylenebisacrylic amide and/or divinylbenzene are preferable.

The content of the crosslinking group having the crosslinking property in the copolymer, as the monomer amount comprising the crosslinking group having the heat crosslinking property during the polymerization is preferably 0.1 to 10 wt %, more preferably 0.1 to 5 wt % with respect to the entire monomer amount of 100 wt %. The content of the crosslinking group having the heat crosslinking property in the copolymer can be controlled by the monomer ratio during the production of the copolymer constituting the binder. By having the content of the crosslinking group having the heat crosslinking property within said range, then the elution to the electrolytic solution is suppressed, and excellent porous membrane strength and the long term cycle characteristic can be exhibited.

The crosslinking group having the heat crosslinking property can be introduced into the copolymer by copolymerzing the monomer forming (meth)acrylonitrile monomer unit and the monomer forming (meth)acrylate monomer unit, the monomer comprising the crosslinking group having the heat crosslinking property, and/or other monomer copolymerizable therewith, when producing said copolymer.

Among these monomers comprising the crosslinking group having the heat crosslinking property, the monomer comprising the epoxy group (including glycidyl group) is preferably used. Regarding the monomer comprising the epoxy group, after it is introduced into the copolymer, the part of the epoxy group is used for the crosslinking as mentioned in the above. The non-reacted epoxy groups which were not used for the crosslinking reacts with the aqueous polymer comprising sulfonic acid group which will be described in the following; thereby it makes the porous membrane further strong. That is, after the coating of the slurry for the porous membrane, in the drying step, the epoxy group in the copolymer and the sulfonic acid group in the aqueous polymer binds with. As a result, the porous membrane becomes further strong, and the powder fall-off is reduced hence the reliability of the battery can be improved.

In the present invention, the above mentioned copolymer as the binder preferably further includes the hydrophilic group selected from the group consisting of carboxylic group, hydroxyl group, and sulfonic acid group. By including said hydrophilic group in the copolymer, both of the disperse stability of the non-conductive particle and the binding property between the non-conductive particles can be improved. Also, since the surface of the non-conductive particle tends to show hydrophilic property, by comprising said hydrophilic group in the binder, the binder tends to become easy to adhere to the surface of the non-conductive particle, and the dispersibility of the non-conductive particle becomes high; hence a smooth porous membrane can be formed on the electrode material mixture layer or on the organic separator.

The hydrophilic group is preferably selected from the group consisting of carboxylic group, hydroxyl group, and sulfonic acid group or so; and from the point of further improving the dispersibility and the binding property of the non-conductive particle, sulfonic acid group or carboxylic group is more preferable.

The hydroxyl group can be introduced, during the production of said copolymer, by copolymerizing the monomer forming (meth)acrylonitrile monomer unit, the monomer forming (meth)acrylate monomer unit, the monomer comprising the hydroxyl group and/or other monomer copolymerizable therewith.

As forth the monomer comprising the carboxylic group, monocarboxylic acid and the derivative thereof, dicarboxylic acid, acid anhydride thereof and the derivative thereof or so may be mentioned.

As for the monocarboxylic acid, acrylic acid, methacrylic acid, crotonic acid or so may be mentioned.

As monocarboxylic acid derivative, 2-ethyl acrylic acid, isocrotonic acid, α-acetoxy acrylic acid, β-trans-aryloxy acrylic acid, α-chloro-β-E-methoxy acrylic acid, β-diamino acrylic acid or so may be mentioned.

As for dicarboxylic acid, maleic acid, fumaric acid, itaconic acid or so may be mentioned.

As for acid anhydride of dicarboxylic acid; maleic anhydride, acrylic acid anhydride, methyl maleic anhydride, dimethylmaleic anhydride or so may be mentioned.

As dicarboxylic derivative, methylallyl maleic acid such as methyl maleate, dimethyl maleate, phenyl maleate, chloro maleate, dichloro maleate, fluoro maleate or so; maleic ester such as diphenyl maleate, nonyl maleate, decyl maleate, dodecyl maleate, octadecyl maleate, fluoroalkyl maleate or so may be mentioned.

As for the monomer comprising the hydroxyl group, ethylene unsaturated alcohol such as (meth)allylalcohol, 3-butene-1-ol, 5-hexene-1-ol or so; alcanol esters of ethylene unsaturated carboxylic acid such as 2 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, di-2-hydroxypropyl itaconate or so; esters between polyalkylene glycol and (meth)acrylic acid expressed by the general formula of $CH_2=CR^1-COO-(C_nH_{2n}O)m-H$ (m is an integer of 2 to 9, n is an integer of 2 to 4, $R^1$ is hydrogen or methyl group); mono(meth)acrylates of dihydroxyester of dicarboxylic acid such as 2-hydroxyethyl-2'-(meth)acryloyloxyphthalate, 2-hydroxyethyl-2'-(meth)acryloyloxysuccinate or so; vinyl ethers such as 2-hydroxyethylvinylether, 2-hydroxypropylvinylether or so; mono(meth)allylethers of alkylene glycol such as (meth)allyl-2-hydroxyethylether, (meth)allyl-2-hydroxypropylether, (meth)allyl-3-hydroxypropylether, (meth)allyl-2-hydroxybutylether, (meth)allyl-3-hydroxybutylether, (meth)allyl-4-hydroxybutylether, (meth)allyl-6-hydroxyhexylether or so; polyalkyleneglycol(meth)monoallylethers such as diethyleneglycolmono(meth)allylether, dipropyleneglycolmono(meth)allylether or so; mono(meth)allylether of halogen and hydroxyl substitute of (poly)alkyleneglycol such as glyceric (meth)allylether, (meth)allyl-2-chloro-3-hydroxypropylether, (meth)allyl-2-hydroxy-3-ehloropropylether or so; mono(meth)allylether and the halogen substitute of the polyvalent phenol such as eugenol, isoeugenol or so; (meth)allylthioethers such as (meth)allyl-2-hydroxyethylthioether, (meth)allyl-2-hydroxypropylthioether or so may be mentioned.

As the monomer comprising sulfonic acid group, vinyl sulfonate, methylvinyl sulfonate, (meth)allyl sulfonate, stylene sulfonate, (meth)acrylic acid-2-ethylsulfonate, 2-acrylamide-2-methylpropane sulfonate, 3-allyloxy-2-hydroxypropane sulfonate or so may be mentioned.

Among these, as for the hydrophilic group, from the point of improving the dispersibility and the binding property or so of the non-conductive particle, sulfonic acid group or carboxylic group is preferable.

The content of the hydrophilic group in the copolymer is, in the amount of the monomer comprising the hydrophilic group during the polymerization, preferably 0.1 to 20 wt %, and more preferably 0.5 to 15 wt % with respect to 100 wt % of entire monomer. The content of the hydrophilic group in the copolymer can be controlled by the monomer ratio during the production of the copolymer constituting the binder. By having the hydrophilic group in the copolymer within said range, the non-conductive particle can be dispersed further better.

In the present invention, in the copolymer suitably used for the binder, it is preferable to include besides the monomer forming (meth)acrylonitrile monomer unit and the monomer forming (meth)acrylate monomer unit, the hydrophilic group and the crosslinking group having the heat crosslinking property. By comprising the crosslinking group having the heat crosslinking property and the hydrophilic group in the copolymer, it becomes easy to increase the crosslinking density and the porous membrane having high strength can be obtained easily.

The copolymer used as the binder in the present invention may include, besides the above mentioned monomer, other monomers copolymerizable therewith. As other monomers, styrene monomers such as styrene, clorostyrene, vinyl toluene, t-butylstyrenevinyl methylbenzoate, vinyl naphthalene, chloromethylstyrene, α-methylstyrene, divinylbenzene or so; olefins such as ethylene, propylene or so; diene monomers such as butadiene, isoprene or so; halogen containing monomers such as vinyl chloride, vinylidene chloride; vinyl esters such as vinyl acetate, vinyl propionate, vinyl lactate or so; vinyl ethers such as methylvinyl ether, ethylvinyl ether, butylvinyl ether or so; vinylketones such as methylvinyl ketone, ethylvinyl ketone, butylvinyl ketone, hexylvinyl ketone, isopropenyl ketone or so; heterocyclic containing vinyl compound such as N-vinylpyrrolidone vinylpyridine, vinylimidazol or so; amide monomers such as acrylic amide, acrylic amide 2-methylpropane sulfonate or so may be mentioned.

The content ratio of the monomer unit other than (meth) acrylonitrile monomer unit and alkyl (meth)acrylate monomer unit in the copolymer is preferably 50 wt % or less, more preferably 40 wt % or less, and particularly preferably 25 wt % or less.

The production method of the copolymer used as the binder is not particularly limited, and any of a solution polymerization method, suspension polymerization method, a bulk polymerization method, an emulsion polymerization method or so may be used. As the polymerization method, any of an ionic polymerization, a radical polymerization, a living radical polymerization can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfte or so may be mentioned.

As the copolymer used as the binder, it is preferably dispersed in water. The method for dispersing the copolymer used as the binder in water is not particularly limited as long as it can be dispersed in water. However, the copolymer may be dispersed in water by the method of polymerizing after dispersing the monomer constituting the copolymer such as in the emulsion polymerization method; or it may be the method of dispersing the copolymer dissolved in a solvent to water, then vaporizing the solvent to disperse in the water. These methods may use the dispersant such as surfactant or so.

In the present invention, the glass transition temperature of the above mentioned copolymer used as the binder is preferably 15° C. or less, and more preferably 0° C. or less; since this will allow to give a flexibility to the porous membrane at the room temperature, and suppress the cracks during the winding of the roll winding, or the breaking of the porous membrane. The glass transition temperature of the copolymer can be regulated by changing the used ratio of the monomer constituting the copolymer.

In the porous membrane of the present invention, the above mentioned copolymer is preferably included in a ratio of 0.1 to 20 parts by weight, more preferably 0.5 to 15 parts by weight, and particularly preferably 0.5 to 10 parts by weight with respect to 100 parts by weight of the non-conductive particle. When the used amount of the above copolymer in the binder is too small, the adhesiveness between the non-conductive particles may be insufficient, or the adhesiveness between the porous membrane and the electrode material mixture layer, and the adhesive force with the organic separator may become insufficient. On the other hand, if the used amount of the copolymer is too much, the relative ratio of the non-conductive particles decline; hence the porosity is compromised.

In the present invention, as the binder, in addition to the copolymer including (meth)acrylonitrile monomer unit and (meth)acrylate monomer unit, other binder component may be used considering the strength, flexibility, and the swelling property to the electrolytic solution being used. As for other binder component, at the high temperature range, it is not particularly limited as long as it is a binder showing excellent high temperature characteristic while maintaining the swelling property to the electrolytic solution and that it does not easily elute. For example, polymer compounds such as fluorine based polymer, diene based polymer, acrylic based polymer which does not include (meth)acrylonitrile monomer unit, polyimide, polyamide, polyurethane based polymer or so may be mentioned; and fluorine based polymer, diene based polymer, acrylic based polymer which does not include (meth)acrylonitrile monomer unit are preferable.

As for the acrylic polymer which does not include (meth) acrylonitrile monomer unit, polybutylacrylate, polybutylmethacrylate, polyhydroxyethylmethacrylate, polyacrylic amide, butylacrylate.styrene copolymer or so may be mentioned.

As for diene based polymer, polybutadiene, polyisoprene, butadiene.styrene random copolymer, isoprene.styrene random copolymer, acrylonitrile.butadiene copolymer, acrylonitrile.butadiene.styrene copolymer, butadiene.styrene.block copolymer, styrene.butadiene.styrene.block copolymer, isoprene.styrene.block copolymer, styrene.isoprene.styrene.block copolymer or so may be mentioned.

As fluorine based polymers, vinylidene fluoride based rubber, ethylene tetrafluoride-propylene rubber or so may be mentioned.

In the present invention, in case of using other binder components, in addition to (meth)acrylonitrile monomer unit and (meth)acrylate monomer unit, the content ratio of these binder is preferably 50 wt % or less and more preferably 30 wt % or less with respect to entire amount of the binder.

In the porous membrane of the present invention, the total content of the binder is preferably 0.1 to 20 parts by weight, more preferably 0.5 to 15 parts by weight, particularly preferably 0.5 to 10 parts by weight with respect to 100 parts by weight of the non-conductive particle. By having the content ratio of the binder in the porous membrane within the above mentioned range, the increase of the resistance is suppressed without interfering the movement of Li ion while maintaining the binding property between the non-conductive particles, the binding property with the electrode material mixture layer or the organic separator, and the flexibility.

(The Aqueous Polymer)

The porous membrane of the present invention includes the aqueous polymer compromising sulfonic acid group, in addition to the binder and the above mentioned non-conductive particle. In the slurry for the porous membrane which will be described in the following, the aqueous polymer is used to improve the dispersibility of the non-conductive particle. This is thought to be due to the suppression of the aggregation of the non-conductive particle due to the aqueous polymer dissolved in the water as the solvent adhering to the surface of the non-conductive particle to cover the surface. As such, the dispersiblity of the non-conductive particle in the slurry can be improved, thus the stability of the slurry for the porous membrane over the time is improved, and the aggregation particle diameter of the non-conductive particle does not change significantly even when it is stored for the long period of time. Also, even in the porous membrane obtained by using said slurry, since the dispersibility of the non-conductive particle is maintained, thin porous membrane having uniform and relatively thick membrane can be obtained. Further, by having the sulfonic acid group of the aqueous polymer when producing the porous membrane, the crosslink structure is formed between the binder, hence the strength (particularly, the hardness) of the porous membrane can be made further stronger.

Note that, in the present invention, the aqueous polymer is a polymer having insoluble matter of less than 0.5 wt % when 0.5 g of the polymer is dissolved in 100 g of water. On the other hand, although it may comprise sulfonic acid group or so, the copolymer used as the binder in the above is insoluble to water since it has crosslink structure, and the amount of the insoluble matter is 0.5 wt % or more.

In the present invention, when the abundance density of the sulfonic acid group comprised in the aqueous polymer increases, the dispersibility of the non-conductive particle improves, and further the viscosity of the slurry for the porous membrane declines. Therefore, it is preferable to comprise many sulfonic acid groups in the aqueous polymer. Specifically, the weight ratio of the sulfonic acid group in 100 wt % of aqueous polymer is preferably 1 wt % or more, more preferably 2 wt % or more, and particularly preferably 4 wt % or more. Also, since usually the sulfonic acid group of the aqueous polymer carries out the crosslink reaction when producing the porous membrane of the present invention, in the present invention, due to the sulfonic acid group, the crosslink structure is formed between the binder. In this case, by comprising the sufficient amount of the sulfonic acid group in the aqueous polymer, the number of the crosslink structure can be increased, thereby the strength (particularly, the hardness) of the porous membrane obtained can be made further strong. Note that, the upper limit of the weight ratio of the sulfonic acid group in the aqueous polymer is preferably 70 wt % or less, more preferably 60 wt % or less, and particularly preferably 50 wt % or less.

The aqueous polymer has the repeating unit comprising the sulfonic acid group (hereinbelow, it may be referred "sulfonic acid unit" accordingly). As for the example of the monomer comprising the sulfonic acid unit, the monomer wherein one of the conjugated double bond of the diene compound such as isoprene and butadiene or so are sulfonated; the monomer comprising the sulfonic acid group and the salt thereof such as vinyl sulfonate, styrene sulfonate, allyl sulfonate, sulfoethylmethacrylate, sulfopropylmethacrylate or so; the monomer comprising the amide group and the sulfonic acid group such as 2-acrylic amide-2-methylpropane sulfonate (AMPS) or so and the salt thereof; the monomer comprising the hydroxyl group and the sulfonic acid group such as 3-allyloxy-2-hydroxypropanesulfonate (HAPS) or so and the salt thereof; or so may be mentioned. Note that, the aqueous polymer may include only one sulfonic acid unit, or it may include two or more sulfonic acid units combined in an arbitrary ratio.

The amount of the sulfonic acid unit included in 100 wt % of aqueous polymer is, in terms of the amount of the sulfonic acid group containing monomer, usually 20 wt % or more, preferably 25 wt % or more, and usually 100 wt % or less, and preferably 90 wt % or less. By having the amount of the sulfonic acid unit within such range, and the amount of the sulfonic acid group within the above mentioned preferable range, the dispersibitlity and the stability of the slurry for the porous membrane of the present invention, and the strength of the porous membrane of the present invention can be made good.

Also, the aqueous polymer preferably includes carboxyl group (—COOH). By including the carboxyl group in the aqueous polymer, the adherence of the aqueous polymer to the non-conductive particle is facilitated; hence the dispersibility of the non-conductive particle can be further improved.

The weight ratio of carboxyl group in 100 wt % of the aqueous polymer is preferably 1 wt % or more, and more preferably 2 wt % or more, and particularly preferably 4 wt % or more; and preferably 60 wt % or less, and 50 wt % or less is more preferable. By having the weight ratio of the carboxyl group equal or more than said lower limit, the solubility of the aqueous polymer to the water is improved and the dispersibility of the non-conductive particle due to the static repulsion of the carboxyl group can be improved; and by having it equal or less than the above mentioned upper limit, the adherence to the non-conductive particle improves thereby the aggregation of the non-conductive particle can be improved.

In case of comprising the carboxyl group, the aqueous polymer comprises the repeating unit comprising the carboxyl group (hereinbelow, it may be referred as "carboxyl unit" accordingly). As for the example of the monomer corresponding to the carboxyl unit, monocarboxylic acid and the derivatives thereof; and dicarboxylic acid and the acid anhydride thereof and the derivatives thereof may be mentioned. As for the example of monocarboxylic acid, acrylic acid, methacrylic acid, and crotonic acid or so may be mentioned. As the example of the derivative of monocarboxylic acid, 2-ethyl acrylic acid, isocrotonic acid, α-acetoxy acrylic acid, β-trans-aryloxy acrylic acid, α-chloro-β-E-methoxy acrylic acid, and β-diamino acrylic acid or so may be mentioned. As example of dicarboxylic acid, maleic acid, fumaric acid, itaconic acid or so may be mentioned. As example of acid anhydride of dicarboxylic acid, maleic anhydride, acrylic acid anhydride, methyl maleic anhydride, dimethylmaleic anhydride or so may be mentioned. As for the example of dicarboxylic derivative, methylallyl maleic acid such as methyl maleic acid, dimethyl maleic acid, phenyl maleic acid, chloro maleic acid, dichloro maleic acid, fluoro maleic acid or so; maleic ester such as diphenyl maleate, nonyl maleate, decyl maleate, dodecyl maleate, octadecyl maleate, fluoroalkyl maleate or so may be mentioned. Note that, the aqueous polymer may be include only one carboxyl unit, or it may include two or more carboxyl units combined in an arbitrary ratio.

The amount of the carboxyl unit included in 100 wt % of aqueous polymer is preferably 20 wt % or more, more preferably 25 wt % or more; and preferably 100 wt % or less and more preferably 90 wt % or less. By having the amount of the carboxyl unit within such range, the amount of the carboxyl group can be made within the preferable range of the above mentioned.

In case the aqueous polymer includes both sulfonic acid group and carboxyl group, the mol ratio between sulfonic acid group and carboxyl group (sulfonate group/carboxyl group) is preferably 5/95 or more, more preferably 10/90 or more; and preferably 95/5 or less and more preferably 90/10 or less. By having said mol ratio equal or more than said lower limit, the sulfonic acid group forms the crosslink structure with the copolymer constituting the binder, and the strength of the porous membrane can be improved. Further, by having equal or lower than said upper limit, the adherence between the aqueous polymer and the non-conductive particle can be improved, thus the dispersibility of the non-conductive particle can be improved.

The aqueous polymer may include repeating unit other than the sulfonic acid group and carboxyl group as long as it does not compromise the effect of the present invention.

Also, in case the aqueous polymer includes two or more of different repeating unit, the aqueous polymer becomes the copolymer. In such case, the aqueous polymer may be, for example, random copolymer, block copolymer, graft copolymer, or a structure combined with these. Since the production is easy, the random copolymer is usually used.

The weight average molecular weight of the aqueous polymer is 1000 or more, preferably 1500 or more; and 15000 or less and preferably 10000 or less. When the weight average molecular weight of the aqueous polymer is less than the lower limit of said range; the adherence of the aqueous polymer to the non-conductive particle declines, and the dispersibility of the non-conductive particle declines as well. Also, if the weight average molecular weight of the aqueous polymer exceeds the upper limit of said range, the non-conductive particle tends to easily aggregate, hence the stability of the slurry for the porous membrane of the present invention declines. Note that, the weight average molecular weight of the polymer may be obtained as the value in terms of polystyrene sodium sulfonate having the water as an eluent using the gel permeation chromatography (GPC).

For example, when the weight average molecular weight of the aqueous polymer is too small, the solubility of the aqueous polymer to the water becomes high hence the motility also becomes high. Therefore, even if the aqueous polymer adheres to the surface of the non-conductive particle, it easily falls-off from the non-conductive particle due to the high motility of the aqueous polymer and the solubility to the water. Therefore, the layer of the aqueous layer present on the surface of the non-conductive particle (the disperse stability layer) becomes loose; hence as a result, there may be a possibility that the non-conductive particle cannot disperse stably. On the other hand, if the weight average molecular weight of the aqueous is too large, plurality of non-conductive particles adheres against each other, hence crosslink aggregation occurs, which may lower the stability. Also, the larger the weight average molecular weight of the aqueous polymer becomes, the viscosity of the slurry for the porous membrane increases; hence the fluidity of the slurry for the porous membrane declines. In such case, the surface of the coated membrane during the formation of the coating membrane of the slurry for the porous membrane becomes difficult to be smooth (leveling); thus the obtained porous membrane may have various thickness.

The amount of the aqueous polymer included in the porous membrane of the present invention, with respect to 100 parts by weight of above mentioned non-conductive particles, is preferably 0.01 parts by weight or more, more preferably 0.02 parts by weight or more, and particularly preferably 0.03 parts by weight or more; and preferably 0.8 parts by weight or less, more preferably 0.5 parts by weight or less, and particularly preferably 0.2 parts by weight or less. By having the amount of the aqueous polymer equal or more than the lower limit of the above range, the dispersibility of the non-conductive particle can be made stably good; and also by having it equal or lower than the upper limit of the above range, the amount of the non-conductive particle can be increased relatively, hence the heat resistance can be improved.

There is no limit for the production method of the aqueous polymer. Also, the method for introducing the sulfonic acid group in the aqueous polymer and also the carboxylic group which introduced depending on the needs has no limit, and for example, using the monomer comprising the sulfonic acid group or the carboxylic group during the production of the aqueous polymer; or carrying out the polymerization using the polymerization initiator comprising the sulfonic acid group or the carboxylic group; or the combination of these may be mentioned. Further, there is no limit for the method for regulating the content ratio for the sulfonic acid group; and for example it may be regulated by the type of the monomer comprising the sulfonic acid group, and the weight ratio or so.

(Other Components)

The porous membrane of the present invention includes the above mentioned non-conductive particle, the binder and the aqueous polymer, and also it may include other components such as a surfactant, the viscosity modifier, the defoaming agent, electrolytic solution additives having the function of the electrolytic solution decomposition suppression or so. These are not particularly limited, as long as it does not influence the battery reaction. These include the component added for improving the stability of the slurry for the porous membrane, and for improving the battery performance.

As for the surfactant, anion surfactant, non-ionic surfactant, cation surfactant, ampholytic surfactant or so may be mentioned.

As for the anionic surfactant, soap, alkylbenzene sulfonates, fatty alcohol sulfates, polyoxyethylene alkylether sulfates, α-sulfofatty acid ester, α-olefinsulfonate, monoalkyl phosphates, alkane sulfonates or so may be mentioned.

As non-ionic surfactant, polyoxyethylene alkylether, polyoxyethylene alkylphenolether, alkylphenol(poly)ethoxylate, alkylglucoside, polyoxyethylene fatty acid ester, sucrose fatty acid ester, sorbitan fatty acid ester, polyoxyethylenesorbitan fatty acid ester, fatty acid alkanolamide or so may be mentioned.

As for the cation surfactant, alkyltrimethylammonium salt, dialkyldimethylammonium salt, alkyldimethylbenzylammonium salt, amine salts or so may be mentioned.

As for ampholytic surfactant, alkylamino fatty acid salt, alkylbetaine, alkylamineoxide or so may be mentioned.

By mixing the surfactant, the repelling during the coating can be prevented, and the smoothness of the electrode can be improved.

Among these, non-ionic surfactant is preferable, and particularly polyoxyalkylenealkyl ether is preferable. Here, the molecular weight of ether part is preferably 220 to 11000, and ether part is preferably polyethylene glycol type.

Among these, the non-ionic surfactant having the cloud point of 30 to 90° C., preferably of 32 to 88° C., and more preferably 35 to 85° C. is suitable. The cloud point refers to the physical value which measures the hydrophilicity/hydrophobicity of the surfactant. The higher the cloud point is, the more hydrophilic it is, and it is measured in accordance with "method B" of "Non-ionic surface active agents obtained from ethylene oxide-1-Determination of cloud point" of ISO 1065-1975 (E). That is, to 25 wt % aqueous solution of butylglycol (2 mol additive of 3,6-oxadecylalcohol:EO of butanol), a sample is introduced so that the concentration is 10 wt %, then uniformly dissolved (usually, it dissolves at 25° C., however in case it does not dissolve, it is cooled till it becomes transparent liquid). Then, about 5 cc of this sample solution is taken to the test tube of outer diameter of 18 mm, total length of 165 mm, thickness of about 1 mm, and further placing the thermometer with one-half degree scale, having diameter of about 6 mm, length of about 250 mm followed by stirring to raise the temperature at 1.5±0.5° C./min; thereby the sample solution becomes clouded. Then, while stirring, by cooling at 1.0±0.2° C./min, the temperature at which the sample solution becomes completely transparent is read; thereby the cloud point is determined.

For the nonionic surfactant having the cloud point within said range, the wettability with the substrate (the organic separator or the electrode material mixture layer) which lowers the dynamic surface tension of the slurry during the coating is improved; hence it can prevent the membrane from becoming thin or having uneven coating.

The content of the surfactant in the slurry for the porous membrane is preferably within the range that does not influence the battery characteristics. Specifically, it is 0.01 to 3 parts by weight, preferably 0.03 to 1.5 parts by weight, and more preferably 0.05 to 1 parts by weight, with respect to 100 parts by weight of non-conductive particles in the slurry for the porous membrane. If the content of the surfactant in the slurry for the porous membrane is too much, particularly when using the slurry for the porous membrane to the organic separator, the permeability force of the slurry to the organic separator becomes too large, thus the slurry may pass through to the back face of the organic separator. Also, when the content of the surfactant in the slurry for the porous membrane is too little, the slurry may be repelled by the organic separator.

As the specific example of the viscosity modifier, cellulose derivative such as carboxymethyl cellulose or so; poly(meth) acrylic acid salt such as sodium poly(meth)acrylate or so; polyvinyl alcohol, modified polyvinyl alcohol, polyethyleneoxide; polyvinyl pyrrolidone, polycarboxylic acid, oxide starch, phosphoric acid starch, casein, various modified starch, chitin, chitosan derivatives or so may be mentioned. Among these, cellulose derivatives are particularly preferable.

The cellulose derivative is a compound of which at least part of hydroxyl group of the cellulose has undergone etherification or esterification; and it is preferably water soluble. The cellulose derivative usually does not have glass transition point. Specifically, carboxymethyl cellulose, carboxymethylethyl cellulose, methyl cellulose, ethyl cellulose, ethylhydroxyethyl cellulose, hydroxyethyl cellulose and hydroxypropyl cellulose or so may be mentioned. Also, the ammonium salts and alkaline metal salts thereof may also be mentioned. Among these, a salt of carboxymethyl cellulose is preferable, and an ammonium salt of carboxymethyl cellulose is particularly preferable. The etherification degree of the cellulose derivative is 0.5 to 2, more preferably 0.5 to 1.5. Note that, the etherification degree here refers to the value showing how many hydroxyl groups which are included by three per glucose unit of the cellulose have undergone etherification in average. When the etherification degree is within this range, the stability of the slurry for the porous membrane is high, and it is less likely to cause the precipitation or aggregation of the solid portion. Further, by using the cellulose derivative, the coating property and the fluidity of the coatings improves.

The viscosity when the solid portion concentration of the viscosity modifier is 1%, is preferably 10 to 8000 mPa·s. By using the viscosity modifier having the viscosity within said range, the uniform coating property of the slurry for the porous membrane is excellent, and the high speed coating property or the stability of the slurry over the time are also excellent. The viscosity when the solid portion concentration of the viscosity modifier is 1% is a value measured after 60 seconds using B type viscometer at 25° C., rotational speed of 60 rpm.

The content of the viscosity modifier in the slurry for the porous membrane is preferably 0.01 to 5 parts by weight, more preferably 0.05 to 4 parts by weight, and particularly preferably 0.05 to 3 parts by weight, with respect to 100 parts by weight of the non-conductive particle in the slurry. When the blending amount of the viscosity modifier is too much, the flexibility of the obtained porous membrane may decline; and if the blending amount is too little, the strength of the porous membrane declines.

Also, as other additive, nano fine particle such as fumed silica or fume alumina or so may be mentioned. By mixing the nano fine particles, the thixotropy of the slurry for the porous membrane can be controlled, and thereby the leveling property of the obtained porous membrane can be improved.

(The Slurry for the Porous Membrane)

As the dispersion medium used in the slurry for the porous membrane of the present invention, water is used. By using the water as the dispersion medium, the aqueous polymer dissolved in the water adheres to the surface of the non-conductive particle to cover said surface, thereby it is thought that the aggregation of the non-conductive particle is suppressed. Therefore, since the dispersibitlity of the non-conductive particle in the slurry can be improved, the stability of the slurry for the porous membrane over the time improves.

In the slurry for the porous membrane, the solid portion ratio of the non-conductive particle, the binder, the water aqueous polymer and arbitrary components added depending on the needs are as the same as the porous membrane mentioned in above; and the slurry for the porous membrane of the present invention is made by dissolving or dispersing these solid portions in the water as the dispersion medium.

The production method of the slurry for the porous membrane is not particularly limited, and it is obtained by mixing the non-conductive particles, the binder, the aqueous polymer, the water and other components added depending on the needs.

The mixing machine is not particularly limited as long as the above mentioned components are mixed uniformly, and a ball mill, a sand mill, a pigment disperser, a grinder, an ultrasonic disperser, a homogenizer, a planetary mixer or so may be used. However, a high power disperser such as a bead mill, a roll mill, a fill mix or so is preferably used.

The solid portion concentration of the slurry for the porous membrane is not particularly limited, as long as the viscosity allows the coating, immersing, and has fluidity; and in general it is 20 to 50 wy % or so.

The viscosity of the slurry for the porous membrane in the present invention is sufficient as long as it is a viscosity suitable for the coating; and preferably it is 10 to 300 mPa·s. By having the viscosity of the slurry for the porous membrane within said range, a thin porous membrane, and an uniform porous membrane without the localization of the binder in the porous membrane or the localization of the non-conductive particle can be produced; and further the porous membrane excellent in uniform coating property, speed coating or the storage stability of the slurry can be obtained. In the present invention, the viscosity of the slurry for the porous membrane is more preferably 10 to 200 mPa·s, and particularly 20 to 100 mPa·s. The viscosity of the slurry for the porous membrane is a value ($\eta_{60}$) measured after 60 seconds using E type viscometer at 25° C., rotational speed of 60 rpm.

The slurry for the porous membrane of the present invention has TI value calculated from the following formula (1), of preferably 1.1 to 3.0, more preferably of 1.2 to 2.0 and particularly preferably of 1.2 to 1.5.

TI value is an index which show the structural viscosity of the slurry; and by having TI value of the slurry for the porous membrane within said range, the non-conductive particle precipitates even less in the slurry for the porous membrane, and it is further unlikely to cause the localization of the binder or the non-conductive particle which occurs during the coating; hence uniform porous membrane can be produced. Further, by having TI value of the slurry for the porous membrane within said range, the viscosity does not increase even when it is sheered during the coating, thus uniform coating can be made and the high speed coating becomes possible.

$$\text{TI value} = \eta_6/\eta_{60} \tag{1}$$

Note that, in the formula (1), $\eta_6$ is a viscosity measured after 60 seconds using E type viscometer at 25° C., rotational speed of 6 rpm, and $\eta_{60}$ is a viscosity measured after 60 seconds using E type viscometer at 25° C., rotational speed of 60 rpm.

In the present invention, as the viscosity of the slurry for the porous membrane and as the method for setting TI value within said range are for example;
(1) as the used viscosity modifier, the viscosity modifier of which the viscosity when the solid portion concentration of the viscosity modifier is 1% is 10 to 8000 mPa·s, preferably within 20 to 5000 mPa·s, and more preferably 50 to 100 mPa·s is used.
(2) regulating the added amount of the used viscosity modifier.
(3) regulating the solid portion concentration of the slurry; or so may be mentioned.

(The Electrode for the Secondary Battery)

The electrode for the secondary battery of the present invention comprises the electrode material mixture layer including the binder for the electrode material mixture layer and the electrode active material, adhered on the current collector, and the above mentioned porous membrane is provided on the electrode material mixture layer. The electrode for the secondary battery of the present invention comprises the porous membrane formed by coating and drying the above mentioned slurry for the porous membrane on said electrode material mixture layer.

The electrode material mixture layer used in the present invention comprises the binder for the electrode material mixture layer and the electrode active material.

(The Binder for the Electrode Material Mixture Layer)

As for the binder for the electrode material mixture layer, various resin components can be used. For example, polyethylene, polytetrafluoroethylene (PTFE), polyvinylidene fluoride (PVDF), tetrafluoroethylene-hexafluoropropylene copolymer (FEP), polyacrylic acid derivatives, polyacrylonitrile derivative or so may be used. These may be used alone, or it may be mixture of two or more.

Further, the soft polymers which are described in the following as the examples may be used as the electrode composite binder.

The acrylic type soft polymers which is the homopolymer of the acrylic acid derivative or the methacrylic acid derivative, or the copolymer of the monomer copolymerizable therewith; such as polybutylacrylate, polybutylmethacrylate, polyhydroxyethylmethacrylate, polyacrylamide, polyacrylonitrile, butylacrylate.stylene copolymer, butylacrylate.acrylonitrile copolymer, butylacrylate.acrylonitrile.glycidylmethacrylate copolymer or so; isobutylene type soft polymer such as polyisobutylene, isobutylene.isoprene rubber, isobutylene.styrene copolymer or so;

diene type soft polymer such as polybutadiene, polyisoprene, butadiene.styrene random copolymer, isoprene.styrene random copolymer, acrylonitrile.butadiene copolymer, acrylonitrile.butadiene.styrene copolymer, butadiene.styrene.block copolymer, styrene.butadiene.styrene.block copolymer, isoprene.styrene.block copolymer, styrene.isoprene.styrene.block copolymer or so;

silicon containing soft copolymer such as dimethylpolysiloxane, diphenylpolysiloxane, dihydroxypolysiloxane or so;

olefin type soft polymer such as liquid polyethylene, polypropylene, poly-1-butene, ethyelene.α-olefin copolymer, propylene.α-olefin copolymer, ethylene.propylene.diene copolymer (EPDM), ethylene.propylene.styrene copolymer or so;

vinyl type soft polymer such as polyvinyl alcohol, polyvinyl acetate, polyvinyl stearic acid, vinyl acetate styrene copolymer or so;

epoxy type soft polymer such as polyethylene oxide, polypropylene oxide, epichlorohydrin rubber or so;

fluoride containing soft polymer such as vinyliden fluoride rubber, tetrafluoroethylene-propylene rubber or so;

other soft polymers such as natural rubber, polypeptide, protein, polyester based thermoplastic elastomer, vinylchloride based thermoplastic elastomer, polyamide based thermoplastic elastomer or so may be mentioned. These soft polymers may have crosslinking structure, or it may be introduced with functional groups by modifications.

The amount of the binder for the electrode material mixture layer in the electrode material mixture layer is preferably 0.1 to 5 parts by weight, more preferably 0.2 to 4 parts by weight, and particularly preferably 0.5 to 3 parts by weight, with respect to 100 parts by weight of the electrode active materials. By having the amount of the binder for the electrode material mixture layer in the electrode material mixture layer within said range, the active material is prevented from falling off from the electrode without interfering the battery reaction.

The binder for the electrode material mixture layer is prepared as the solvent or the disperser for producing the electrode. The viscosity at that time is usually within the range of 1 mPa·S to 300,000 mPa·s, and preferably 50 mPa·s to 10,000 mPa·s. Said viscosity is the value measured using the B type viscometer under 25° C. and at the rotation speed of 60 rpm.

(The Electrode Active Material)

The lithium ion secondary battery active materials can be anything as long as it can load and release lithium ions reversibly by applying the electrical potentials in the electrolytes; and the inorganic or organic compounds may be used.

The electrode active materials for the positive electrode of the lithium ion secondary battery (positive electrode active materials) can be largely separated to those formed from the inorganic compounds and the organic compounds. As for the positive electrode active material formed of the inorganic compound, the transition metal oxide, the composite oxide between lithium and the transition metal, and the transition metal sulfides or so may be mentioned. As for the above mentioned transition metals, Fe, Co, Ni, Mn or so may be used. As for the specific examples of the inorganic materials used for the positive electrode active materials, the lithium containing composite metal oxides such as $LiCoO_2$, $LiNiO_2$, $LiMnO_2$, $LiMn_2O_4$, $LiFePO_4$, $LiFeVO_4$ or so; the transition metal sulfides such as $TiS_2$, $TiS_3$, amorphous $MoS_2$ or so; the transition metal oxides such as $Cu_2V_2O_3$, amorphous $V_2O$—

$P_2O_5$, $MoO_3$, $V_2O_5$, $V_6O_{13}$ or so may be mentioned. These compounds may partially be element substituted. As for the positive electrode active materials formed from the organic compounds, for example, conductive macromolecule such as polyacetylene, poly-p-phenylene or so may be used. Iron oxides having the poor electric conductivity may be used as the electrode active materials covered with the carbon materials by providing the carbon source substances during the reduction firing. Also, these compounds may be partially element substituted.

The positive electrode active materials for the lithium ion secondary battery may be mixture of above mentioned inorganic compounds and organic compounds. The particle diameter of the positive electrode active materials are selected depending on the balance between other constitutional elements of the battery; however usually the 50% volume cumulative diameter is 0.1 to 50 μm, preferably 1 to 20 μm, from the point of improving the battery characteristics such as the load characteristics and the cycle characteristics or so. When the 50% volume cumulative diameter is within this range, the secondary battery with the large charge-discharge capacity can be obtained, and also the handling when producing the electrode slurry and the electrodes are easy. The 50% volume cumulative diameter can be obtained by measuring the particle distribution by laser diffraction.

As for the electrode active materials (the negative electrode active materials) of the lithium ion secondary battery negative electrode, carbon materials such as amorphous carbons, graphite, natural graphite, mesocarbonmicrobeads, pitch type carbon fiber or so, and the conductive macromolecules such as polyacenes or so may be mentioned. Also, as the negative electrode active materials, metals such as silicon, tin, zinc, manganese, iron, nickel or so and the alloys thereof, oxides and sulfates of said metals and the alloys may be used. Additionally, lithium alloys such as metallic lithium, Li—Al, Li—Bi—Cd, Li—Sn—Cd or so, lithium transition metal nitrides, silicon or so may be used. The electrode active material of which the conductivity imparting material is provided on the surface using the mechanical modification method may be used. The particle diameter of the negative electrode active materials are selected depending on the balance between other constitutional elements of the battery; however usually the 50% volume cumulative diameter is 1 to 50 μm, preferably 15 to 30 μm, from the point of improving the battery characteristics such as the initial efficiency, the load characteristics and the cycle characteristics or so.

In the present invention, the electrode material mixture layer may comprise the conductive material or the reinforcement material or so. As the conductive material, a conductive carbon such as acetylene black, Ketjen black, carbon black, graphite, vapor phase epitaxy carbon fiber, carbon nano tube or so can be used. The carbon powders such as graphite, fibers or foils of various metals may be mentioned. As the reinforcement material, filler of a spherical shape, a planer shape, a rod shape or a fiber shape of various inorganics and organics can be used. By using the conductive material, the electrical contact between the electrode active materials can be improved, and in case of using the lithium ion secondary battery, the discharge rate characteristic can be improved. The used amount of the reinforcement material is usually 0 to 20 parts by weight, preferably 1 to 10 parts by weight, with respect to 100 parts by weight of the electrode active material.

The electrode material mixture layer can be formed by adhering the slurry including the binder for the electrode material mixture layer, the electrode active material and the solvent (hereinafter, it may be referred as "the composite layer") to the current collector.

As the solvent, it only needs to be those which allow the binder for the electrode material mixture layer to dissolve or disperse in a particle form. By using the solvent which dissolves the binder for the electrode material mixture layer, the binder for the electrode material mixture layer adhere to the surface of the electrode active material thereby the dispersion of the electrode active material stabilize.

The composite slurry comprises the solvent, and it can be obtained by dispersing the electrode active material, essential components of the binder for the electrode material mixture layer, and arbitrary components such as conductivity material or so. As the solvent, it is preferable to use those which can dissolve said binder, since the dispersibility of the electrode active materials and the conductivity material will be excellent. By using the binder for the electrode material mixture layer in a condition of being dissolved in the solvent, the binder adheres onto the surface of the electrode active material or so, and due to the volume effect thereof, the dispersing is thought to be stabilized.

As the solvent used for the slurry for the electrode material mixture layer, either of water or the organic solvent can be used. As the organic solvents, cyclic aliphatic hydrocarbons such as cyclopentane, cyclohexane or so; aromatic hydrocarbons such as toluene, xylene or so; ketones such as ethylmethylketone, cyclohexanone or so; esters such as ethyl acetate, butyl acetate, γ-butyroprolactone, ε-caprolactone or so; acylo nitriles such as acetonitrile, propionitrile or so; ethers such as tetrahydrofuran, ethyleneglycoldiethylether or so; alcohols such as methanol, ethanol, isopropanol, ethyleneglycol, ethyleneglycolmonomethylether or so; amides such as N-methylpyrrolidone, N,N-dimethylformamide or so may be mentioned. These solvents can be used alone or by mixing, depending on the drying speed and the environmental concerns. Among these, in the present invention from the point of the electrode swelling property to the water, it is preferable to use non-aqueous solvent.

In the composite slurry, the additives expressing various functions such as thickener or so can be further added. As the thickener, the polymer soluble in the organic solvent used in the composite slurry is used. Specifically, acrylonitrile-butadiene copolymer hydrides or so may be mentioned.

Further, in the composite slurry, besides the above mentioned components, in order to enhance the stability and the lifetime of the battery, trifluoropropylenecarbonate, vinylenecarbonate, catechol carbonate, 1,6-dioxaspiro[4,4]nonane-2,7-dione, 12-crown-4-ether or so can be used. Also, these may be used by comprising in the electrolytic solution which will be described in the followings.

The amount of the solvent in the composite slurry is controlled to have suitable viscosity for coating depending on the types of the electrode active materials or the binder for the electrode, and then it is used. Specifically, it is controlled so that the concentration of the solid portion combining the electrode active material, the binder for the electrode material mixture layer and the arbitrary additives in the slurry for the electrode are preferably 30 to 90 wt %, more preferably 40 to 80 wt %.

The composite slurry is obtained by mixing the electrode active material, the binder for the electrode material mixture layer, the conductive material which is added depending on the needs, other additives, and the solvent, by using the mixing device. The mixing may be done by supplying the above mentioned components into the mixing device at once. When using the electrode active material, the binder for the electrode material mixture layer, the conductive material and the thickener, the conductive material and the thickener are mixed in the solvent to disperse the conductive material into a fine particle form, then the binder for the electrode material mixture layer and the electrode active material are added and further mixed. By doing so, the dispersibility of the slurry improves, thus it is preferable. As the mixing machine, the ball mill, the sand mill, the pigment disperser, the grinder, the ultrasonic disperser, the homogenizer, the planetary mixer, a Hobart mixer or so can be used; however the ball mill is preferably used since the aggregation of the conductive material and the electrode active material can be suppressed.

The particle size of the composite slurry is preferably 35 μm or less, and further preferably 25 μm or less. When the particle size of the slurry is within the above mentioned range, the dispersibility of the conductive material is high, and the uniform electrode can be obtained.

The current collector is not limited as long as it is a material having the electroconductivity and the electrochemical durability; however from the point of having the heat resistance, for example, the metal materials such as iron, copper, aluminum, nickel, stainless steel, titanium, tantalum, gold, platinum or so are preferable. Among these, as for the positive electrode of the nonaqueous electrolyte lithium ion secondary battery, aluminum is preferable, and as the negative electrode, copper is particularly preferable. The shape of the current collector is not particularly limited; however it is preferably a sheet form having a thickness of 0.001 to 0.5 mm or so. The current collector is preferably used by carrying out the surface roughening treatment in advance to enhance the binding strength of the composite slurry. As the surface roughening method, a mechanical grinding, electrolytic grinding, chemical grinding or so may be mentioned. In the mechanical grinding, a grinding cloth with the grinding particles, grind stone, emery wheel, a wire brush equipped with a steel wire or so may be used. Also, in order to enhance the conductivity or the binding strength of the electrode material mixture layer, an intermediate layer may be formed on the surface of the current collector.

The production method of the electrode material mixture layer only needs to be the method of binding the electrode material mixture layer to at least one side and preferably to both sides of the current collector in a layer form. For example, said composite slurry is coated on the current collector and dried; followed by applying the heat for one hour or longer at 120° C. or higher thereby forming the electrode material mixture layer. The method of coating the composite slurry to the current collector is not particularly limited. For example, it may be a doctor blade method, a dip method, a reverse roll method, a direct roll method, a gravure method, an extrusion method or a brush method or so. As for the drying method, for example, the drying by warm air, hot air, or low humidified air, a vacuum drying, an irradiation of (far) infrared ray or electron beam or so may be mentioned.

Next, by using the metal mold press or the roll press, it is preferable to lower the porosity of the composite slurry by the pressure applying process. The preferable porosity is 5 to 15%, more preferably 7 to 13%. If the porosity is too high, the charge efficiency or the discharge efficiency is deteriorated. If the porosity is too low, it becomes difficult to obtain the high volume capacity, or a problem such as a releasing of the electrode active material layer takes place easily which then easily causes the malfunction or so. Further, when using the curable polymer, it is preferably cured.

The thickness of the electrode material mixture layer is, for both of the positive and the negative electrode, usually 5 to 300 μm, and more preferably 10 to 250 μm.

The method of coating the slurry for the porous membrane of the present invention to the electrode material mixture layer is not particularly limited. For example, it may be a doctor blade method, a dip method, a reverse roll method, a direct roll method, a gravure method, an extrusion method or a brush method or so. Among these, from the point of obtaining the uniform porous membrane, the dip method or the gravure method is preferable.

As for the drying method, for example, the drying by warm air, hot air, or low humidified air, a vacuum drying, an irradiation of (far) infrared ray or electron beam or so may be mentioned. The drying temperature can be changed depending on the type of the used solvent. In order to completely remove the solvent, for example, in case of using the solvent having low volatility such as N-methylpyrrolidone or so as the solvent, it is preferable to dry at high temperature of 120° C. or higher using the air blower. On the other hand, in case of using the solvent having high volatility, it can be dried at a low temperature of 100° C. or lower.

Next, if needed, by using the metal mold press or the roll press, it is possible to improve the adhesiveness between the electrode material mixture layer and the porous membrane by the pressure applying process. Note that, at this time, if the pressure applying process is carried out excessively, the porosity of the porous membrane may be compromised, hence the pressure and the time applying the pressure is controlled suitably.

The separator for the secondary battery of the present invention comprises the above mentioned porous membrane on the organic separator. The separator for the secondary battery of the present invention comprises the porous membrane which is formed by coating and drying the slurry for the porous membrane on the organic separator.

(The Organic Separator)

As for the organic separator used in the present invention, the porous membrane without the electron conductivity but with ion conductivity, having high resistance against the organic solvent and fine porous diameter is used; and for example, the fine porous membrane formed by the resin such as polyolefins (polyethylene, polypropylene, polybutene, polyvinyl chloride), and the mixtures thereof, or the copolymer thereof; the fine porous membrane formed of resins such as polyethylenetelephthalate, polycycloolefin, polyethersulfon, polyamide, polyimide, polyimideamide, polyalamide, polycycloolefin, nylon, polytetrafluoroethylene or so; or the weaved fibers of the polyolefins or unwoven fabrics thereof; or the bulk structure of the insulative particles or so may be mentioned. Among these, the fine porous membrane formed of the polyolefin resin is preferable since it has excellent coating property of the slurry for the porous membrane, and enables to increases the active material ratio in the battery and enables to make the thickness of the entire separator thin; thereby increases the capacity per volume.

The thickness of the organic separator is usually 0.5 to 40 μm, preferably 1 to 30 μm, and more preferably 1 to 10 μm. When it is within this range, the resistance caused by the organic separator in the battery becomes small. Also, the slurry for the porous membrane has good processing property when coating to the organic separator.

In the present invention, as the polyolefin resin used as the material of the separator, homopolymer, copolymer of polyethylene, polypropylene or so, and the mixtures thereof may be mentioned. As the polyethylene, polyethylene having low density, intermediate density, or high density can be mentioned, and from the point of the nail penetration strength and the mechanical strength, the high density polyethylene is preferable. Also, these polyethylenes may be combined with two or more thereof in order to provide the flexibility. The polymerization catalyst used for these polyethylenes are not limited, and a Ziegler-Natta catalyst, a Phillips catalyst, or a metallocene catalyst or so may be mentioned. From the point of establishing the mechanical strength and the high permeability, the viscosity average molecular weight of polyethylene is 100,000 or more and 12,000,000 or less, and more preferably 200,000 or more and 3,000,000 or less. As polypropylene, homopolymer, random copolymer, block copolymer or so may be mentioned, and it can be used alone or by mixing two or more thereof. Also, the polymerization catalyst is not particularly limited, the Ziegler-Natta catalyst, or the metallocene catalyst or so may be mentioned. The stereoregurality is not particularly limited; and isotactic, syndiotactic, atactic can be used; however it is preferable to use isotactic polypropylene since it is inexpensive. Further, within the range which does not compromise the effect of the present invention, polyolefin may be added with suitable amount of additives such as polyolefin other than polyethylene or polypropylene, the antioxidant and nucleating agent or so.

As for the method for producing the polyolefin organic separator, those widely known is used, and for example, the dry method of forming the fine porous membrane by forming the film by melt extrusion of polypropylene or polyethylene, annealing at low temperature to grow the crystalline domain, then under such condition, stretching the amorphous area; and the wet method of mixing the hydrocarbon solvent or other low molecular weight material and polypropylene, polyethylene, to form the film, then carrying out the removal of the solvent or low molecular material from the film of which the solvent and low molecules have formed island phases on the amorphous phase by using the solvent which easily evaporates, thereby forming the fine porous membrane; or so may be selected. Among these, in order to reduce the resistance, the dry method is preferable since large air spaces are easily obtained.

The organic separator used in the present invention may include an arbitrary filler or fibrous compounds in order to control the strength, the rigidity, and the thermal shrinkage. Also, in case of stacking the layers of the porous membrane including the non-conductive particle and the binder, in order to improve the adhesiveness, and to improve the impregnating ability of the liquid by reducing the surface tension against the electrolytic solution, the organic separator surface may be carried out with the covering treatment by low molecular compounds or polymer compounds; or an electromagnetic beam treatment such as ultraviolet ray, or plasma treatment such as corona discharge plasma gas or so may be carried out. Particularly, as it is easy to obtain the high impregnating ability of the electrolytic solution and the adhesiveness between said porous membranes, it is preferable to carry out the covering treatment with polymer compounds comprising the polar group such as carboxylic acid group, hydroxyl group, and sulfonic acid group or so.

The organic separator used in the present invention may be a multilayered structure of said organic separators in order to increase the tear strength and the nail penetration strength. Specifically, the multilayered body of the polyethylene fine porous membrane and polypropylene fine porous membrane, and the multilayered body made of non-woven fabric and polyolefin type separator or so may be mentioned.

The method of coating the slurry for the porous membrane of the present invention onto the organic separator is not particularly limited. For example, it may be a doctor blade method, a dip method, a reverse roll method, a direct roll method, a gravure method, an extrusion method or a brush method or so. Among these, from the point of obtaining the uniform porous membrane, the dip method or the gravure method is preferable.

As for the drying method, for example, the drying by warm air, hot air, or low humidified air, a vacuum drying, an irradiation of (far) infrared ray or electron beam or so may be mentioned.

The drying temperature can be changed depending on the type of the used solvent. In order to completely remove the solvent, for example, in case of using the solvent having low volatility such as N-methylpyrrolidone as the solvent, it is preferable to dry at high temperature of 120° C. or higher using the air blower. On the other hand, in case of using the solvent having high volatility, it can be dried at a low temperature of 100° C. or lower.

By providing the porous membrane on the organic separator, the Gurley value after the formation of the porous membrane generally increases. However, the increase rate of the Gurley value can be maintained low, even when the porous membrane of the present invention is provided. The lower the increase rate of the Gurley value is, the more excellent the permeability of the ions or so is, and hence it indicates an excellent rate characteristic in the battery.

By providing the porous membrane on the organic separator, the thermal shrinkage of the separator with the porous membrane can be reduced. Therefore, even when the temperature of the battery is increased, the short circuit due to the thermal shrinkage of the organic separator is prevented; hence it can be contribute to the improvement of the safety of the battery.

In case the slurry for the porous membrane is coated on the organic separator, the temperature is preferably high, as long as the temperature is at where the separator does not shrink, however it is preferably within the range of 50 to 90° C.

The membrane thickness of the porous membrane formed on the electrode material mixture layer or on the organic separator is not particularly limited, and it is set depending on the applied filed or the object of the use of the porous membrane; and if it is too thin an even membrane cannot be formed and if too thick, the capacity per volume (weight) in the battery declines, hence it is preferably 0.5 to 50 μm and more preferably 0.5 to 10 μm.

The porous membrane formed on the electrode material mixture layer or the organic separator is formed by binding the non-conductive particle via the binder, and has a structure of which the air space are formed between the non-conductive particles. Since the electrolytic solution can permeate through this air space, there is no interference of the battery reaction.

(The Secondary Battery)

The secondary battery of the present invention comprises the positive electrode, the negative electrode, the separator and the electrolytic solution; and at least one of said positive electrode or the negative electrode is said electrode for the secondary battery (hereinbelow, it may be referred as "the first secondary battery").

Other embodiment of the secondary battery of the present invention comprises the positive electrode, the negative electrode, the separator and the electrolytic solution; and said separator is the separator for the secondary battery (hereinbelow, this may be referred as "the second secondary battery").

As the secondary battery, the lithium ion secondary battery or nickel-metal hydride secondary battery or so may be mentioned. Among these, the lithium ion secondary battery is preferable, since improved safety is most demanded, and also it has the highest porous membrane introduction effect. Therefore, hereinbelow, the case using the lithium ion secondary battery will be explained.

(The Electrolytic Solution)

As the electrolytic solution, the organic electrolytic solution in which the supporting electrolytes are dissolved in the organic solvent is used. As the supporting electrolyte, lithium salts are used. As lithium salts, it is not particularly limited, however $LiPF_6$, $LiAsF_6$, $LiBF_4$, $LiSbF_6$, $LiAlCl_4$, $LiClO_4$, $CF_3SO_3L_1$, $C_4F_9SO_3L_1$, $CF_3COOLi$, $(CF_3CO)_2NLi$, $(CF_3SO_2)_2NLi$, $(C_2F_5SO_2)NLi$ or so may be mentioned. Among these, $LiPF_6$, $LiClO_4$, $CF_3SO_3Li$ are preferable since it dissolves easily and exhibits high dissociation degree. These may be used by combining two or more thereof. The higher the dissociation degree of the supporting electrolytes is used, the higher the lithium ion conductivity is; hence the lithium ion conductivity can be regulated by the type of the supporting electrolytes.

As for the organic solvent used in the electrolytic solution, it is not particularly limited as long as it can dissolve the supporting electrolytes; however carbonates such as dimethyl carbonate (DMC), ethylene carbonate (EC), diethyl carbonate (DEC), propylene carbonate (PC), butylenes carbonate (BC), and methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be used suitably. Also, the mixture of these solvents may be used as well. Among these, the carbonate groups are preferable since it has high dielectric constant, and a wide range of a stable electrical potential range. The lower the viscosity of the used solvent is, the higher the lithium ion conductivity is; and hence the lithium ion conductivity can be regulated by the type of the solvent.

The concentration of the supporting electrolytes in the electrolytic solution is usually 1 to 30 wt %, preferably 5 to 20 wt %. Also, depending on the type of the supporting electrolytes, it is usually used in the concentration of 0.5 to 2.5 mmol/L. The ionic conductivity tends to lower when the concentration of the supporting electrolytes are too low or too high. As the lower the concentration of the used electrolytic solution is, the larger the swelling degree of the polymer particle is; thus the lithium ion conductivity can be regulated by the concentration of the electrolytic solution.

In the above mentioned first secondary battery, as the separator, the organic separator mentioned in the separator for the secondary battery may be mentioned. As the positive electrode and the negative electrode, said electrode for the secondary battery may be used.

In the second secondary battery, as the positive electrode and the negative electrode formed by stacking said porous membrane, those which the current collector adhered with the electrode material mixture layer including the binder for the electrode material mixture layer and the electrode active material, which were exemplified in said electrode for the secondary battery, may be mentioned. As the separator, said separator for the secondary battery may be used.

In the secondary battery of the present invention, said electrode for secondary battery may be used as the positive electrode and the negative electrode; and said separator for the secondary battery may be used as the separator.

As for the specific production method of the lithium ion secondary battery, the method of stacking the negative electrode and the positive electrode against each other via the organic separator, and rolling or bending according to the shape of the battery to place in the battery container, then closing the battery container after the electrolytic solution is introduced therein may be mentioned. The porous membrane of the present invention is formed onto any one of the positive electrode, the negative electrode and the organic separator.

Also, it is possible to stack only by the porous membrane. The pressure rising inside the battery, the excessive discharge and charge can be prevented by introducing the overcurrent prevention element such as the expand metals, the fuse, PTC element or so depending on the needs. The shape of the battery may be any of a coin shape, a button shape, a sheet shape, a cylinder shape, a square shape, and a squamous shape or so.

EXAMPLE

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

(The Measurement of the Volume Average Particle Diameter of the Non-Conductive Particles)

The volume average particle diameter of the non-conductive particles was measured by LASER diffraction particle size analyzer (SALD-2000: made by Shimadzu Corporation).

(The Shape Measurement of the Non-Conductive Particle)

The long diameter L, the width (b), and the thickness (t) of the non-conductive particle was obtained by observing with scanning electron microscope (SEM), and directly measuring from the printed photograph. Arbitrary 300 particles were measured and the average value was obtained.

(The Dispersibitlity of the Slurry for the Porous Membrane)

By using the LASER diffraction particle size analyzer (SALD-2000: made by Shimadzu Corporation), the volume average particle diameter D50 of the non-conductive particle of the slurry for the porous membrane of the after the preparation was obtained, thereby the dispersibility of the slurry was evaluated by the following standard. The closer the volume average particle diameter D50 of the non-conductive particle in the slurry is to the primary particle diameter of the non-conductive particle, it indicates better dispersibility.

SA: the volume average particle diameter D50 of the non-conductive particle in the slurry is less than 1.2 times of the primary particle diameter of the non-conductive particle.

A: the volume average particle diameter D50 of the non-conductive particle in the slurry is 1.2 times or more and less than 1.4 times of the primary particle diameter of the non-conductive particle.

B: the volume average particle diameter D50 of the non-conductive particle in the slurry is 1.4 times or more and less than 1.6 times of the primary particle diameter of the non-conductive particle.

C: the volume average particle diameter D50 of the non-conductive particle in the slurry is 1.6 times or more and less than 1.8 times of the primary particle diameter of the non-conductive particle.

D: the volume average particle diameter D50 of the non-conductive particle in the slurry is 1.8 times or more and less than 2.0 times of the primary particle diameter of the non-conductive particle.

E: the volume average particle diameter D50 of the non-conductive particle in the slurry is 2.0 times or more of the primary particle diameter of the non-conductive particle.

(The Storage Stability of the Slurry for the Porous Membrane)

By using the LASER diffraction particle size analyzer (SALD-2000: made by Shimadzu Corporation), the volume average particle diameter of 1 day after the preparation ($d50_1$) of the slurry for the porous membrane, and the volume average particle diameter after 5 days of the preparation ($d50_5$)

were measured to obtain the volume diameter change rate (=$d50_5/d50_1$) of the non-conductive particle in the slurry and evaluated the aggregation property of the slurry by the following standard. The smaller the change rate of the volume average particle diameter is, the better the storage stability is.
SA: the change rate of the volume average particle diameter D50 is less than 1.2 times.
A: the change rate of the volume average particle diameter D50 is 1.2 times or more and less than 1.4 times.
B: the change rate of the volume average particle diameter D50 is 1.4 times or more and less than 1.6 times.
C: the change rate of the volume average particle diameter D50 is 1.6 times or more and less than 1.8 times.
D: the change rate of the volume average particle diameter D50 is 1.8 times or more and less than 2.0 times.
E: the change rate of the volume average particle diameter D50 is more than 2 times or more.
(The Viscosity of the Slurry for the Porous Membrane)

The viscosity of the slurry for the porous membrane was measured by the cone plate rotational viscometer (25° C., rotational speed: 6 rpm, 60 rpm, plate: 42) in accordance with JIS Z8803:1991.

TI value (thixotropic index value) was calculated using the following formula based on the viscosity $\eta_6$ after 60 seconds at rotational speed of 6 rpm, and $\eta_{60}$ after 60 seconds at rotational speed of 60 rpm.

$$\text{TI value} = \eta_6/\eta_{60} \tag{1}$$

(The Powder Falling Property)

The electrode with the porous membrane or the separator with the porous membrane was cut into a parallel piped shape of width 1 cm×length 5 cm to make a specimen. The side of the porous membrane of the specimen was placed on the table facing up, then at the center of the length direction (the position at 2.5 cm from the end) of the current collector or the organic separator, the stainless rod of the diameter of 1 mm was placed in the short direction, and the specimen was 180° folded so that the porous membrane faces outwards. The above test was carried out to 10 specimens, and for each specimen, the presences of cracks or powder fall off were observed at the part where it was bended, and the evaluation was made by below standard. The lesser the crack or the powder fall off are, the more excellent the electrode composite agent layer or the porous membrane formed on the organic separator are in regards the powder fall off property. Note that, regarding the separator with the porous membrane, in case the porous membrane is formed on the both sides of the organic separator, the powder fall off property of the porous membrane formed first is evaluated.
SA: None of the ten specimens show the cracks or the powder fall off.
A: 1 to 2 out of 10 specimens show the cracks or the powder fall off.
B: 3 to 4 out of 10 specimens show the cracks or the powder fall off.
C: 5 to 6 out of 10 specimens show the cracks or the powder fall off.
D: 7 to 8 out of 10 specimens show the cracks or the powder fall off.
E: 9 or more out of 10 specimens show the cracks or the powder fall off.
(The Increase Rate of the Gurley Value of the Separator)

The original substrate (the organic separator) and the separator with the porous membrane were carried out with the measurement of Gurley value (sec/100 cc) using Gurley measurement device (SMOOTH & POROSITY METER (measuring diameter: □ 2.9 cm) made by KUMAGAI RIKI KOGYO CO., LTD). Thereby, by providing the porous membrane, the rate of which the Gurley value has increased compared with the original substrate (the organic separator) was determined, and evaluated by the following standard. The Lower the increasing rate of the Gurley value, the better the ion permeability is, and it indicates excellent rate characteristic of the battery.
SA: the increase rate of the Gurley value was less than 4%.
A: the increase rate of the Gurley value was 4% or more and less than 8%.
B: the increase rate of the Gurley value was 8% or more and less than 12%.
C: the increase rate of the Gurley value was 12% or more and less than 16%.
D: the increase rate of the Gurley value was 16% or more and less than 20%.
E: the increase rate of the Gurley value was 20% or more.
(The Thermal Shrinkage of the Separator)

The separator with the organic membrane was cut into a square shape of width 5 cm×length 5 cm to form a specimen. After leaving the specimen in a thermostat chamber of 150° C. for 1 hour, the change in a area of the square was determined as the thermal shrinkage. The above test was carried out to 5 specimens, and the thermal shrinkage of each of the specimen was evaluated by the following standard. The smaller the thermal shrinkage is, it indicates excellent thermal shrinkage of the separator.
SA: the thermal shrinkage of all five specimens was less than 1%.
A: 1 out of 5 specimens had the thermal shrinkage of 1% or more.
B: 2 out of 5 specimens had the thermal shrinkage of 1% or more.
C: 3 out of 5 specimens had the thermal shrinkage of 1% or more.
D: 4 out of 5 specimens had the thermal shrinkage of 1% or more.
E: All 5 specimens had the thermal shrinkage of 1% or more.
(The High Temperature Cycle Characteristic of the Battery)

In regards with the full cell coin type battery of 10 cells, it was charged to 4.2V by the constant current method of 0.2 C at 60° C., it was discharged until it reaches to 3.0V; this charge and discharge was repeated and the discharge capacity was measured. The average value of the 10 cells were set as the measured value, the ratio (%) of the electric capacity of the $50^{th}$ cycle with respect to the electric capacity of $5^{th}$ cycle was calculated, thereby the capacity maintaining ratio was obtained, and the cycle characteristics was evaluated by the below standards. The higher this value is, the better the high temperature cycle characteristic is.
SA: the capacity maintaining ratio was 80% or more.
A: the capacity maintaining ratio was 70% or more and less than 80%.
B: the capacity maintaining ratio was 60% or more and less than 70%.
C: the capacity maintaining ratio was 50% or more and less than 60%.
D: the capacity maintaining ratio was 40% or more and less than 50%.
E: the capacity maintaining ratio was 30% or more and less than 40%.
F: the capacity maintaining ratio was less than 30%.
(The Rate Characteristic of the Battery)

Using the full cell coin type battery of 10 cells, the charge and discharge cycle of charging to 4.2V by the constant current method of 0.1 C and discharging to 3.0V by the constant current method of 0.1 C at 25° C., and discharging to 3.0V by the constant current method of 1.0 C at 25° C. were carried out respectively. The ratio of the discharge capacity at 1.0 C with respect to the battery capacity at 0.1 C was calculated in a percentage and the charge and discharge rate characteristic was determined, and evaluated by the following standard. The larger the value is, the smaller the internal resistance is, hence it indicates that the fast charge and discharge is possible.

SA: the charge and discharge characteristic is 80% or more.
A: the charge and discharge characteristic is 75% or more and less than 80%.
B: the charge and discharge characteristic is 70% or more and less than 75%.
C: the charge and discharge characteristic is 65% or more and less than 70%.
D: the charge and discharge characteristic is 60% or more and less than 65%.
E: the charge and discharge characteristic is 55% or more and less than 60%.
F: the charge and discharge characteristic is less than 55%.

Also, the used non-conductive particle, the binder and the aqueous polymer are as follows.

[The Non-Conductive Particle]
(The Plate Shape Alumina A)

The alumina particle of which (L/b) is 1.5, (b/t) of 50, (L) is 5 μm, and the volume average particle diameter of 0.6 μm.

(The Plate Shape Alumina B)

The alumina particle of which (L/b) is 1.3, (b/t) of 113, (L) is 6 μm, and the volume average particle diameter of 2 μm.

(The Plate Shape Alumina C)

The alumina particle of which (L/b) is 1.4, (b/t) of 100, (L) is 10 μm, and the volume average particle diameter of 5 μm.

(The Particulate Alumina)

The alumina particle of which (L/b) is 1.2, (b/t) of 1, (L) is 1 μm, and the volume average particle diameter of 0.5 μm.

[The Binder]
(The Aqueous Dispersion Including the Binder)

In to the reaction machine with the stirrer, 70 parts of ion exchange water, 0.2 parts of sodium dodecylbenzenesulfonate, 0.5 parts of ammonium persulfate, and 0.15 parts of sodium lauryl sulfate as the emulsifier (product name: "EMAL 2F" made by Kao Corporation) were introduced, and mixed to obtain the mixture; then the gaseous phase was substituted with nitrogen gas and the temperature was raised to 60° C.

Meanwhile, in a separate container, 50 parts of ion exchange water, 0.5 parts of sodium dodecylbenzenesulfonate, 94.8 parts of butylacrylate as the polymerizable monomer, 2 parts of acrylonitrile, 2 parts of methcarylic acid, 1.2 parts of N-methylolacrylamide, 1 part of allylglycidylether (AGE) were mixed, thereby the monomer mixture was obtained. This monomer mixture was added continuously into the above reaction machine for 4 hours to carry out the polymerization. The addition was carried out at 60° C. After the continuous addition, the reaction was continued for 3 hours at 70° C., thereby the aqueous dispersion including the binder (the binder dispersion) was obtained. The polymerization conversion rate was 99% or more.

In the obtained binder, the weight ratio expressed by "(meth)acrylonitrile monomer unit/(meth)acrylate monomer unit" was 2/94.8, and the abundance of the crosslinking monomer unit with respect to 100 parts by weight of the total of (meth)acrylonitrile monomer unit and (meth)acrylate monomer unit was 2.2 parts by weight. The volume average particle diameter was 370 nm.

(NMP Solution Including the Binder)

In to the reaction machine with the stirrer, 70 parts of ion exchange water, 0.2 parts of sodium dodecylbenzenesulfonate, 0.5 parts of ammonium persulfate, and 0.15 parts of sodium lauryl sulfate as the emulsifier (product name: "EMAL 2F" made by Kao Corporation) were introduced, and mixed to obtain the mixture then the gaseous phase was substituted with nitrogen gas and the temperature was raised to 60° C.

Meanwhile, in a separate container, 95 parts of ion exchange water, 0.5 parts of sodium dodecylbenzenesulfonate, 94.8 parts of butylacrylate as the polymerizable monomer, 2 parts of acrylonitrile, 2 parts of methcarylic acid, 1.2 parts of N-methylolacrylamide, 1 part of allylglycidylether (AGE) were mixed, thereby the monomer mixture was obtained. This monomer mixture was added continuously into the above reaction machine for 4 hours to carry out the polymerization. The addition was carried out at 60° C. After the continuous addition, the reaction was continued for 3 hours at 70° C., thereby the aqueous dispersion including the binder (the binder dispersion) was obtained. The polymerization conversion rate was 99% or more. 320 parts of NMP was added into this aqueous dispersion and the water was evaporated under the pressure reduced condition, thereby the NMP solution of the binder was obtained. The solid portion concentration pf NMP solution of the binder was 10% and the viscosity was 75 mPa·s.

In the obtained binder, the weight ratio expressed by "(meth)acrylonitrile monomer unit/(meth)acrylate monomer unit" was 2/94.8, and the abundance of the crosslinking monomer unit with respect to 100 parts by weight of the total of (meth)acrylonitrile monomer unit and (meth)acrylate monomer unit was 2.2 parts by weight.

[The Aqueous Polymer]
(The Aqueous Polymer A)

In to the separable flask made by SUS with a capacity of 1 L comprising the stirrer and the thermometer; 249.0 g of demineralized water was introduced in advance, and stirred at 90° C. While stirring, 286 g of sodium acrylate solution having a concentration of 35% (the solid portion 100 g), 250 g of 3-allyloxy-2-hydroxy-1-sodium propane sulfate solution having a concentration of 40% (solid portion 100 g), and 200 g of ammonium persulfate having the concentration of 5% were dripped each separately over 3.5 hours. After dripping all of it, the boiling reflux condition was maintain for 30 minutes to complete the polymerization; thereby the aqueous solution of the aqueous polymer A of copolymer was obtained. When the obtained aqueous solution of the aqueous polymer A of copolymer was analyzed, the weight average molecular weight of the aqueous polymer A was 6,000. The amount of the sulfonic acid unit including this aqueous polymer A was 50 wt %, and the weight ratio of the sulfonic acid group in the aqueous polymerization A was 15 wt %.

[The Aqueous Solution B]

The aqueous solution of the aqueous polymer B which is a copolymer was obtained by the same production examples of the aqueous polymer A except for changing the amount of sodium acrylic acid to 429 g (the solid portion 150 g), the amount of 3-allyloxy-2-hydroxy-1-sodium propane sulfate solution to 150 g (the solid portion 60 g), and the amount of ammonium persulfate solution to 100 g. When the obtained aqueous solution of the aqueous polymer B of copolymer was analyzed, the weight average molecular weight of the aqueous polymer B was 11,500. The amount of the sulfonic acid unit including this aqueous polymer B was 29 wt %, and the weight ratio of the sulfonic acid group in the aqueous polymerization B was 5 wt %.

(The Aqueous Polymer C)

The aqueous solution of the aqueous polymer C which is a copolymer was obtained by the same production examples of the aqueous polymer A except for changing the amount of sodium acrylic acid to 114 g (the solid portion 40 g), the amount of 3-allyloxy-2-hydroxy-1-sodium propane sulfate solution to 400 g (the solid portion 160 g), and the amount of ammonium persulfate solution to 300 g. When the obtained aqueous solution of the aqueous polymer C of copolymer was analyzed, the weight average molecular weight of the aqueous polymer C was 4,000. The amount of the sulfonate unit including this aqueous polymer C was 80 wt %, and the weight ratio of the sulfonic acidsulfonic acid group in the aqueous polymerization C was 23 wt %.

[The Surfactant]

(The Surfanctant A)

Polyoxyalkylenealkylether based surfactant (SAN NOPCO SN-WET 980) (the cloud point 36° C.)

(The Surfanctant B)

Polyethyleneglycol based surfactant (SAN NOPCO SN-WET 366) (the cloud point 44° C.)

(The Surfanctant C)

Polyoxyalkylenealkylether type surfactant (EMULGEN LS-114) (the cloud point 88° C.)

Example 1

The Preparation of the Sample

As for the non-conductive particle, the plate shape alumina particle A was prepared wherein (L/b) of 1.5, (b/t) of 50, (L) of 5 μm, and the volume average particle diameter of 0.6 μm.

As for the viscosity modifier, carboxymethyl cellulose (product name BSH-12, made by DAI-ICHI KOGYO SEIYAKU CO., LTD) of which the average polymerization degree of 1600 to 1800 and the etherification degree of 0.65 to 0.75 was used. Note that, the viscosity of 1% aqueous solution of the viscosity modifier was 6000 to 8000 mPa·s.

(The Production of the Slurry for the Porous Membrane)

100 parts of planer shape alumina A, 0.1 parts of the aqueous polymer A, and 0.1 parts of viscosity modifier were mixed, and water was further mixed so that the solid portion concentration becomes 40 wt %, and it was dispersed using beads mill. Then, the amount of 4 parts in terms of the solid portion of the aqueous dispersion including the binder, 0.2 parts of surfactant A were added to produce the slurry 1 for the porous membrane. Note that, the used amount of the aqueous polymer, the viscosity modifier, the binder, the surfactant is in the ratio with respect to 100 parts of plate shape alumina particle A.

Regarding the viscosity, TI value, the dispersibility, and the storage stability of slurry 1 for the porous membrane was evaluated.

(The Production of the Separator)

Said slurry 1 for the porous membrane was coated using the gravure coater at the speed of 20 m/min, on the single layer separator made of polyethylene produced by the wet method having the width of 300 mm, the length of 1000 mm and the thickness of 15 μm so that the thickness after the drying becomes 5 μm; then dried by the drying furnace at 50° C. Then, the porous membrane was formed on the separator made of polyethylene by winding.

Similarly, the separator (separator with the porous membrane) having the porous membrane of the thickness was obtained by coating the slurry 1 for the porous membrane at another side, and by drying. Regarding the obtained separator 1, the powder fall off property, the increase rate of the Gurley value, and the thermal shrinkage were evaluated.

<The Production of the Positive Electrode>

To 95 parts of lithium manganese having the spinel structure as the positive electrode active material, 3 parts, in terms of the solid portion, of PVDF (polyvinyldene fluoride, the product name: KF-1100 made by KUREHA CORPORATION) as the binder for the electrode was added; and 2 parts of acetylene black and 20 parts of N-methylpyrrolidone were added; then these were mixed by the planetary mixer, thereby the slurry for the positive electrode composition layer was obtained. This slurry for the positive electrode material mixture layer was coated on one side of the aluminum foil having the thickness of 18 μm, then after drying for 3 hours at 120° C., it was roll pressed; thereby obtained the positive electrode comprising the positive electrode material mixture layer with the entire thickness of 100 μm.

<The Production of the Negative Electrode>

98 parts of graphite having the particle size of 20 μm and the specific area of 4.2 m$^2$/g as the negative electrode active material and 1 part, in terms of the solid portion, of SBR (styrene-butadiene rubber, the glass transition temperature: –10° C.) as the binder for the electrode were mixed; then to this mixture, 1.0 part of carboxymethylcellulose was mixed, and water was further added as the solvent. Then, these were mixed by the planetary mixer; thereby the slurry for the negative electrode material mixture layer was obtained. This slurry for the negative electrode material mixture layer was coated on one side of the copper foil having the thickness of 18 μm, then after drying for 3 hours at 120° C., it was roll pressed; thereby the negative electrode comprising the negative electrode material mixture layer with the thickness of 60 μm was obtained.

<The Production of the Secondary Battery Comprising the Organic Separator with the Porous Membrane>

The positive electrode obtained in the above was cut into a circular shape having a diameter of 13 mm; thereby the circular positive electrode was obtained. The negative electrode obtained in the above was cut into a circular shape having a diameter of 14 mm; thereby the circular negative electrode was obtained. Also, the organic separator with the porous membrane obtained in the above was cut into a circular shape having a diameter of 18 mm; thereby the circular shape organic separator with the porous membrane was obtained.

The circular positive electrode was placed at the bottom face of the coin shape outer container made of stainless steel provided with the polypropylene packing, and the circular organic separator with the porous membrane was placed thereon, then the circular negative electrode was further placed thereon; and these were placed in the container. The circular positive electrode was placed so that the face of the aluminum foil side faced towards the bottom face of the outer container and the face of the positive electrode active material layer side faces upwards. The circular negative electrode was placed so that the face of the negative electrode active material layer side faces toward the organic separator with the porous membrane and the face of the copper foil side faces upward.

The electrolytic solution was introduced in the container so that no air remains therein, and the stainless steel cap having the thickness of 0.2 mm was placed over the outer container via the polypropylene packing then fixed to seal the battery can; thereby the lithium ion secondary battery (the coin cell CR2032) having the thickness of about 3.2 mm and a diameter of 20 mm was produced. As for the electrolytic solution, the solvent wherein $LiPF_6$ was dissolved in a concentration of 1 mol/litter in the mixed solvent which is the mixture of ethylenecarbonate (EC) and diethylcarbonate (DEC) of EC:DEC=1:2 (the capacity ratio at 20° C.) was used. The cycle characteristic and the rate characteristic were measured for the obtained battery. The results are shown in Table 2.

Example 2

The Production of the Electrode with the Porous Membrane

Said slurry 1 for the porous membrane was coated using the gravure coater at the speed of 10 m/min on the obtained negative electrode which was obtained as same as the example 1, so that the negative electrode material mixture layer was completely covered and that the thickness after drying was 5 μm; then it was dried at 90° C., and the electrode 1 with the porous membrane was obtained by winding. The flexibility and the powder fall off property were evaluated. The results are shown in Table 2.

The positive electrode obtained in the example 1 was cut into a circular shape having a diameter of 13 mm; thereby the circular positive electrode was obtained. The negative electrode with the porous membrane obtained in the above was cut into a circular shape having a diameter of 14 mm; thereby the circular negative electrode was obtained. Also, the single layer organic separator made of polyethylene obtained in the above was cut into a circular shape having a diameter of 18 mm; thereby the circular shape organic separator.

The circular positive electrode was placed at the bottom face of the coin shape outer container made of stainless steel provided with the polypropylene packing, and the circular organic separator with the porous membrane was placed thereon, then the circular negative electrode with the porous membrane was further placed thereon; and these were placed in the container. The circular positive electrode was placed so that the face of the aluminum foil side faced towards the bottom face of the outer container and the face of the positive electrode active material layer side faces upwards. The circular negative electrode with the porous membrane was placed so that the face of the porous membrane side faces toward the organic separator and the face of the copper foil side faces upward.

The electrolytic solution was introduced in the container so that no air remains therein, and the stainless steel cap having the thickness of 0.2 mm was placed over the outer container via the polypropylene packing then fixed to seal the battery can; thereby the lithium ion secondary battery (the coin cell CR2032) having the thickness of about 3.2 mm and a diameter of 20 mm was produced. As for the electrolytic solution, the solvent wherein $LiPF_6$ was dissolved in a concentration of 1 mol/litter in the mixed solvent which is the mixture of ethylenecarbonate (EC) and diethylcarbonate (DEC) of EC:DEC=1:2 (the capacity ratio at 20° C.) was used. The cycle characteristic and the rate characteristic were measured for the obtained battery. The results are shown in Table 2.

Examples 3 and 4

The same procedures as Example 1 were carried out except for changing the blending amount of the viscosity modifier to that shown in Table 1. The results are shown in Table 2. Note that, in Example 4, the coating speed was set to 15 m/min.

Examples 5 to 8

The same procedures as Example 1 were carried out except for changing the type and blending amount of the surfactants to that shown in Table 1. The results are shown in Table 2.

Examples 9 to 11

The same procedures as Example 1 were carried out except for changing the surfactant A to the surfactant B, and changing the blending amount of the aqueous polymer to that shown in Table 1. The results are shown in Table 2.

Example 12

It was made as same as Example 1 except for not using the surfactant. The results are shown in Table 2.

Example 13

It was made as same as Example 1 except for changing the surfactant A to the surfactant B and changing the blending amount of the aqueous polymer to that shown in Table 1. The results are shown in Table 2.

Example 14

It was made as same as Example 1 except for changing the type of the aqueous polymer to that shown in Table 1. The results are shown in Table 2

Example 15

It was made as same as Example 1 except for changing the plate shape alumina particle A to the plate shape alumina particle B. The results are shown in Table 2.

Example 16

It was made as same as Example 1 except for changing the plate shape alumina particle A to the plate shape alumina particle C. The results are shown in Table 2.

Comparative Example 1

It was made as same as Example 1 except for changing the surfactant A to the surfactant B, and not blending the aqueous polymer. The results are shown in Table 2.

Comparative Example 2

100 parts of plate shape alumina particle, 25 parts of NMP solution of the binder, and further N-methylpyrrolidone were mixed so that the solid portion concentration becomes 40%, and it was dispersed using the beads mill there by the slurry 2 for the porous membrane was produced.

Except for using slurry 2 for the porous membrane instead of the slurry 1 for the porous membrane, it was made as same as Example 1. The results are shown in Table 2.

Comparative Example 3

It was made as same as Example 2 except for not blending the aqueous polymer, the surfactant, and the viscosity modifier. The results are shown in Table 2.

Comparative Example 4

Except for using the particulate alumina particle instead of the plate shape alumina particle A, and not blending the aqueous polymer, the surfactant, and the viscosity modifier, it was made as same as Example 2. The results are shown in Table 2.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Non-conductive particle | | Planar shape alumina A | Planar shape alumina A | Planar shape alumina A | Planar shape alumina A | Planar shape alumina A | Planar shape alumina A | Planar shape alumina A | Planar shape alumina A | Planar shape alumina A | Planar shape alumina A |
| Binder | Blending amount (with respect to 100 parts of non-conductive particle) | 4 | 4 | 4 | 4 | 4 | 4 | 4 | 4 | 4 | 4 |
| Aqueous polymer | Type | Aqieous polymer A | Aqieous polymer A | Aqieous polymer A | Aqieous polymer A | Aqieous polymer A | Aqieous polymer A | Aqieous polymer A | Aqieous polymer A | Aqieous polymer A | Aqieous polymer A |
|  | Blending amount (with respect to 100 parts of non-conductive particle) | 0.1 | 0.1 | 0.1 | 0.1 | 0.1 | 0.1 | 0.1 | 0.1 | 0.2 | 0.05 |
| Surfactant | Type | Surfactant A | Surfactant A | Surfactant A | Surfactant A | Surfactant A | Surfactant A | Surfactant B | Surfactant C | Surfactant B | Surfactant B |
|  | Blending amount (with respect to 100 parts of non-conductive particle) | 0.2 | 0.2 | 0.2 | 0.2 | 0.05 | 0.8 | 0.2 | 0.2 | 0.2 | 0.2 |
| Viscosity modifier, Blending amount (with respect to 100 parts of non-conductive particle) | | 0.1 | 0.1 | 0.3 | 0.8 | 0.1 | 0.1 | 0.1 | 0.1 | 0.1 | 0.1 |
| Slurry dispersing medium | | Water | Water | Water | Water | Water | Water | Water | Water | Water | Water |
| Porous membmae formed part | | Separator | Electrode | Separator | Separator | Separator | Separator | Separator | Separator | Separator | Separator |

|  |  | Example 11 | Example 12 | Example 13 | Example 14 | Example 15 | Example 16 | Comparative Example 1 | Comparative Example 2 | Comparative Example 3 | Comparative Example 4 |
|---|---|---|---|---|---|---|---|---|---|---|---|
| Non-conductive particle | | Planar shape alumina A | Planar shape alumina A | Planar shape alumina A | Planar shape alumina A | Planaer alumina B | Planaer alumina C | Planar shape alumina A | Planar shape alumina A | Planar shape alumina A | Particular alumina |
| Binder | Blending amount (with respect to 100 parts of non-conductive particle) | 4 | 4 | 4 | 4 | 4 | 4 | 4 | 4 | 4 | 4 |
| Aqueous polymer | Type | Aqieous polymer A | Aqieous polymer A | Aqieous polymer B | Aqieous polymer C | Aqieous polymer A | Aqieous polymer A | None | None | None | None |
|  | Blending amount (with respect to 100 parts of non-conductive particle) | 0.3 | 0.1 | 0.1 | 0.1 | 0.1 | 0.1 | 0 | 0 | 0 | 0 |
| Surfactant | Type | Surfactant B | None | Surfactant B | Surfactant A | Surfactant A | Surfactant A | Surfactant B | None | None | None |
|  | Blending amount (with respect to 100 parts of non-conductive particle) | 0.2 | 0 | 0.2 | 0.2 | 0.2 | 0.2 | 0.2 | 0 | 0 | 0 |
| Viscosity modifier, Blending amount (with respect to 100 parts of non-conductive particle) | | 0.1 | 0.1 | 0.1 | 0.1 | 0.1 | 0.1 | 0.1 | 0 | 0 | 0 |
| Slurry dispersing medium | | Water | Water | Water | Water | Water | Water | Water | NMP | Water | Water |
| Porous membmae formed part | | Separator | Separator | Separator | Separator | Separator | Separator | Separator | Separator | Electrode | Electrode |

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Slurry | Porous membrane slurry characteristic: Dispersibility of the slurry composition | SA | SA | SA | A | SA | SA | SA | SA | SA | A |
|  | Porous membrane characteristic: Storage stability of the slurry composition | SA | SA | SA | A | SA | SA | SA | SA | SA | A |

TABLE 2-continued

|  | | | | | | | | | | |
|---|---|---|---|---|---|---|---|---|---|---|
| Viscosity of the slurry composition 6 rpm (mPa·s) | 96 | 96 | 268 | 452 | 92 | 96 | 92 | 93 | 93 | 140 |
| 60 rpm (mPa·s) | 35 | 35 | 99 | 172 | 34 | 36 | 35 | 34 | 32 | 54 |
| TI value | 2.7 | 2.7 | 2.7 | 2.6 | 2.7 | 2.7 | 2.6 | 2.7 | 2.9 | 2.6 |
| Coating speed (m/min) | 20 | 10 | 20 | 15 | 20 | 20 | 20 | 20 | 20 | 20 |
| Thickness of the porous membrane (μm) | 5.0 | 5.0 | 5.0 | 5.0 | 5.0 | 5.0 | 5.0 | 5.0 | 5.0 | 5.0 |
| Powder fall off property of the electrode and the separator | SA | SA | A | A | A | A | A | A | A | A |
| Increase rate of Gurley value of the separator | SA | — | A | B | SA | SA | SA | SA | SA | SA |
| Thermal shrinkage of the separator | A | — | SA | SA | A | A | A | A | A | B |
| Battery characteristic: High temperature cycle characteristic | SA | SA | A | A | A | A | A | A | A | A |
| Battery characteristic: Rate characteristic | SA | SA | A | A | A | A | A | A | A | A |

|  | | Example 11 | Example 12 | Example 13 | Example 14 | Example 15 | Example 16 | Comparative Example 1 | Comparative Example 2 | Comparative Example 3 | Comparative Example 4 |
|---|---|---|---|---|---|---|---|---|---|---|---|
| Slurry | Porous membrane slurry characteristic: Dispersibility of the slurry composition | SA | SA | A | A | A | A | C | C | C | B |
|  | Porous membrane characteristic: Storage stability of the slurry composition | SA | A | A | A | A | A | D | C | C | B |
|  | Viscosity of the slurry composition 6 rpm (mPa·s) | 85 | 94 | 98 | 96 | 67 | 54 | 270 | 13 | 1075 | 41 |
|  | 60 rpm (mPa·s) | 29 | 36 | 36 | 37 | 32 | 35 | 98 | 6 | 330 | 35 |
|  | TI value | 2.9 | 2.6 | 2.7 | 2.6 | 2.1 | 1.5 | 2.8 | 2.2 | 3.3 | 1.2 |
| Coating speed (m/min) | | 20 | 20 | 20 | 20 | 20 | 20 | 20 | 15 | 6 | 13 |
| Thickness of the porous membrane (μm) | | 5.0 | 5.0 | 5.0 | 5.0 | 5.0 | 5.0 | 5.0 | 2.5 | 7.0 | 5.0 |
| Powder fall off property of the electrode and the separator | | A | B | A | SA | SA | SA | B | D | D | C |
| Increase rate of Gurley value of the separator | | SA | A | A | SA | A | B | A | A | — | — |
| Thermal shrinkage of the separator | | A | B | A | A | SA | SA | B | E | — | — |
| Battery characteristic: High temperature cycle characteristic | | A | A | A | SA | A | B | B | C | C | C |
| Battery characteristic: Rate characteristic | | A | A | A | SA | A | B | B | C | C | C |

The following can be understood from the results shown in Table 1 and 2. According to the present invention, as shown by Examples 1 to 16, by using the sulfonic acid group as the aqueous polymer, the slurry for the porous membrane excellent in the dispersibility and the storage stability can be obtained. By forming the porous membrane using this slurry for the porous membrane, the orientation or the thermal shrinkage of the porous membrane improves and the powder fall off can be suppressed. Thereby, the high temperature cycle characteristic, the rate characteristic and the safety of the secondary battery comprising the porous membrane can be enhanced.

On the other hand, in case the aqueous polymer including the sulfonic acid group is not used (Comparative examples 1 to 4), the storage stability and the dispersibility of the porous membrane slurry deteriorates, and the thermal shrinkage and the powder fall off of the obtained porous membrane deteriorate. Therefore, the high temperature characteristic, the rate characteristic and the safety deteriorate.

The invention claimed is:

1. A porous membrane for a secondary battery including a non-conductive particle, a binder and an aqueous polymer; wherein:
said non-conductive particle long diameter L is 0.1 to 20 μm and ratio (b/t) between width (b) and thickness (t) is 1.5 to 100,
said binder is a copolymer including (meth)acrylonitrile monomer unit and (meth)acrylate monomer unit; and
said aqueous polymer includes sulfonic acid group and a weight average molecular weight is 1000 to 15000.

2. The porous membrane for the secondary battery as set forth in claim 1 wherein a ratio (=(meth)acrylonitrile monomer unit/(meth)acrylate monomer unit) between (meth)acrylonitrile monomer unit and (meth)acrylate monomer unit in said copolymer is 1/99 to 20/80 in terms of a weight ratio.

3. The porous membrane for the secondary battery as set forth in claim 1 wherein said binder is crosslinkable by heat applying or an energy ray irradiation.

4. The porous membrane for the secondary battery as set forth in claim 1, wherein said copolymer includes a crosslinking group having heat crosslinking property, and said crosslinking group having heat crosslinking property is at least one selected from the group consisting of epoxy group, N-methylolamide group, and oxazolline group.

5. The porous membrane for the secondary battery as set forth in claim 1, wherein said copolymer includes a hydrophilic group selected from the group consisting of carboxyl acid group, hydroxyl group and sulfonic acid group.

6. The porous membrane for the secondary battery as set forth in claim 1, wherein an amount of a repeating unit comprising said sulfonic acid group in said aqueous polymer is 25 wt % or more and 90 wt % or less in terms of sulfonic acid group containing monomer amount.

7. The porous membrane for the secondary battery as set forth in claim 1, wherein said aqueous polymer includes a repeating unit comprising a carboxyl group.

8. The porous membrane for the secondary battery as set forth in claim 1 including a nonionic surfactant having a cloud point of 30 to 90° C.

9. A slurry for a secondary battery porous membrane including a non-conductive particle, a binder, an aqueous polymer and water; wherein:
- said non-conductive particle long diameter L is 0.1 to 20 μm and ratio (b/t) between width (b) and thickness (t) is 1.5 to 100,
- said binder is a copolymer including (meth)acrylonitrile monomer unit and (meth)acrylate monomer unit; and
- said aqueous polymer includes sulfonic acid group and a weight average molecular weight is 1000 to 15000.

10. The slurry for the secondary battery porous membrane as set forth in claim 9 wherein a TI value of said porous membrane slurry is 1.1 to 3.0.

11. The slurry for the secondary battery porous membrane as set forth in claim 9 wherein a ratio (=(meth)acrylonitrile monomer unit/(meth)acrylate monomer unit) between (meth)acrylonitrile monomer unit and (meth)acrylate monomer unit in said copolymer is 1/99 to 20/80 in terms of a weight ratio.

12. The slurry for the secondary battery porous membrane as set forth in claim 9 wherein said binder is crosslinkable by heat applying or an energy ray irradiation.

13. The slurry for the secondary battery porous membrane as set forth in claim 9, wherein said copolymer includes a crosslinking group having heat crosslinking property, and said crosslinking group having heat crosslinking property is at least one selected from the group consisting of epoxy group, N-methylolamide group, and oxazolline group.

14. An electrode for a secondary battery, wherein an electrode material mixture layer including a binder for the electrode material mixture layer and an electrode active material is adhered to a current collector, and said electrode comprises the porous membrane as set forth in claim 1 on said electrode material mixture layer.

15. A separator for a secondary battery comprising the porous membrane as set forth in claim 1 on an organic separator.

16. A secondary battery comprising a positive electrode, a negative electrode and an electrolytic solution, wherein at least one of said positive electrode and negative electrode is the electrode for the secondary battery as set forth in claim 14.

17. A secondary battery comprising a positive electrode, a negative electrode, a separator and an electrolytic solution, wherein said separator is the separator for the secondary battery as set forth in claim 15.

18. The porous membrane for the secondary battery as set forth in claim 2 wherein said binder is crosslinkable by heat applying or an energy ray irradiation.

19. The porous membrane for the secondary battery as set forth in claim 2, wherein said copolymer includes a crosslinking group having heat crosslinking property, and said crosslinking group having heat crosslinking property is at least one selected from the group consisting of epoxy group, N-methylolamide group, and oxazolline group.

20. The porous membrane for the secondary battery as set forth in claim 1, wherein the ratio (b/t) between the width (b) and the thickness (t) is 3 to 100.

21. The porous membrane for the secondary battery as set forth in claim 1, wherein a ratio (L/b) between the long diameter (L) and the width (b) is 1 to 100.

* * * * *